US009514387B2

(12) United States Patent
Eaton

(10) Patent No.: US 9,514,387 B2
(45) Date of Patent: Dec. 6, 2016

(54) SYSTEM AND METHOD OF MONITORING AND MEASURING CLUSTER PERFORMANCE HOSTED BY AN IAAS PROVIDER BY MEANS OF OUTLIER DETECTION

(71) Applicant: Google Inc., Mountain View, CA (US)

(72) Inventor: Patrick Randolph Eaton, Arlington, MA (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 14/144,980

(22) Filed: Dec. 31, 2013

(65) Prior Publication Data

US 2015/0081881 A1  Mar. 19, 2015

Related U.S. Application Data

(60) Provisional application No. 61/879,002, filed on Sep. 17, 2013.

(51) Int. Cl.
| | |
|---|---|
| *G06F 15/173* | (2006.01) |
| *G06K 9/62* | (2006.01) |
| *H04L 12/915* | (2013.01) |
| *H04L 12/26* | (2006.01) |
| *G06F 9/50* | (2006.01) |

(Continued)

(52) U.S. Cl.
CPC ........... *G06K 9/6219* (2013.01); *G06F 9/5027* (2013.01); *G06F 9/5072* (2013.01); *H04L 43/04* (2013.01); *H04L 43/06* (2013.01); *H04L 43/0817* (2013.01); *H04L 43/16* (2013.01); *H04L 47/785* (2013.01); *G06F 11/3409* (2013.01); *G06F 11/3447* (2013.01); *G06F 11/366* (2013.01); *G06F 2209/501* (2013.01); *H04L 41/069* (2013.01); *H04L 41/0677* (2013.01); *H04L 41/0893* (2013.01); *H04L 41/12* (2013.01); *H04L 41/142* (2013.01); *H04L 41/18* (2013.01); *H04L 41/5096* (2013.01); *H04L 43/12* (2013.01); *H04L 63/1425* (2013.01); *H04L 67/10* (2013.01)

(58) Field of Classification Search
USPC ............ 709/224; 702/179, 88, 186; 718/105
See application file for complete search history.

(56) References Cited

U.S. PATENT DOCUMENTS

| | | | | |
|---|---|---|---|---|
| 2001/0013008 | A1* | 8/2001 | Waclawski | .......... G06F 11/3409 702/186 |
| 2002/0144177 | A1 | 10/2002 | Kondo et al. | |

(Continued)

*Primary Examiner* — Kyung H Shin
(74) *Attorney, Agent, or Firm* — Fish & Richardson P.C.

(57) ABSTRACT

The present disclosure is directed to a system for monitoring and analyzing operation of a widely distributed service operated by an Infrastructure-as-a-Service (IaaS) tenant but deployed on a set of virtual resources controlled by an independent IaaS provider. The set of virtual resources can be organized into clusters in which resources are expected to behave similarly to each other. Virtual resources that do not behave similar to peer resources in the same cluster, i.e., outliers, may be indicative of problems that need to be addressed. The monitoring system can collect performance metric data from virtual resources, and compare the performance of each virtual resource in a cluster with the performance of every other virtual resource in the cluster to detect outliers. This comparison can involve correlation analysis, ANOVA analysis, or regression analysis.

7 Claims, 18 Drawing Sheets

(51) Int. Cl.
  *G06F 11/36* (2006.01)
  *G06F 11/34* (2006.01)
  *H04L 29/06* (2006.01)
  *H04L 12/24* (2006.01)
  *H04L 29/08* (2006.01)

(56) References Cited

U.S. PATENT DOCUMENTS

| | | | |
|---|---|---|---|
| 2009/0070771 A1* | 3/2009 | Yuyitung | G06Q 10/06 |
| | | | 718/105 |
| 2010/0088150 A1 | 4/2010 | Mazhar et al. | |
| 2012/0066450 A1 | 3/2012 | Yochai et al. | |
| 2012/0079480 A1 | 3/2012 | Liu | |
| 2012/0124307 A1 | 5/2012 | Ashutosh et al. | |
| 2012/0303835 A1 | 11/2012 | Kempf et al. | |
| 2013/0030761 A1* | 1/2013 | Lakshminarayan | G06K 9/6219 |
| | | | 702/179 |
| 2013/0111349 A1 | 5/2013 | Yan et al. | |
| 2013/0191527 A1 | 7/2013 | Ashok | |
| 2013/0211762 A1* | 8/2013 | Taskov | G06F 11/366 |
| | | | 702/88 |
| 2013/0212279 A1 | 8/2013 | Dutta | |
| 2013/0346594 A1* | 12/2013 | Banerjee | G06F 11/3447 |
| | | | 709/224 |
| 2014/0040580 A1 | 2/2014 | Kripalani | |
| 2014/0047341 A1 | 2/2014 | Breternitz et al. | |
| 2014/0075033 A1 | 3/2014 | Doering et al. | |
| 2014/0089509 A1 | 3/2014 | Akolkar | |
| 2014/0149494 A1 | 5/2014 | Markley et al. | |
| 2015/0081883 A1 | 3/2015 | Katz | |
| 2015/0295844 A1 | 10/2015 | Perreira | |

* cited by examiner

SYSTEM AND METHOD OF MONITORING AND MEASURING CLUSTER PERFORMANCE HOSTED BY AN IAAS PROVIDER BY MEANS OF OUTLIER DETECTION

CROSS REFERENCE TO RELATED APPLICATIONS

This application claims the benefit of priority under 35 U.S.C. §119(e) to U.S. Provisional Application No. 61/879, 002, filed Sep. 17, 2013, which is hereby incorporated by reference in its entirety.

This application is related to the following references:

U.S. patent application Ser. No. (TBA), filed concurrently herewith and entitled "SYSTEM AND METHOD OF ALERTING ON EPHEMERAL RESOURCES FROM AN IAAS PROVIDER," with Attorney Docket No. 2209392.125;

U.S. patent application Ser. No. (TBA), filed concurrently herewith and entitled "SYSTEM AND METHOD OF SEMANTICALLY MODELLING AND MONITORING APPLICATIONS AND SOFTWARE ARCHITECTURE HOSTED BY AN IAAS PROVIDER," with Attorney Docket No. 2209392.126;

U.S. patent application Ser. No. (TBA), filed concurrently herewith and entitled "SYSTEM AND METHOD OF ADAPTIVELY AND DYNAMICALLY MODELLING AND MONITORING APPLICATIONS AND SOFTWARE ARCHITECTURE HOSTED BY AN IAAS PROVIDER," with Attorney Docket No. 2209392.127; and U.S. patent application Ser. No. (TBA), filed concurrently herewith and entitled "SYSTEM AND METHOD OF MONITORING AND MEASURING PERFORMANCE RELATIVE TO EXPECTED PERFORMANCE CHARACTERISTICS FOR APPLICATIONS AND SOFTWARE ARCHITECTURE HOSTED BY AN IAAS PROVIDER," with Attorney Docket No. 2209392.128.

TECHNICAL FIELD

In general, the present disclosure relates to methods, apparatus and systems for measuring and monitoring resources and metrics related to cloud-based applications. Specifically, the present disclosure relates to systems, methods, and apparatuses for monitoring and measuring cluster performance hosted by an IaaS provider by means of outlier detection.

BACKGROUND

Instead of being provided from a centralized set of infrastructure owned and operated by a single entity, data services and applications being offered on the Internet today are increasingly being hosted in a virtualized, multi-tenant infrastructure environment. For example, whereas a photo sharing service might have formerly been hosted on a set of servers and databases operated by the owner or operator of the photo sharing service, today that same photo sharing service might be hosted on a set of "virtual" infrastructure operated by third party providers, such as Amazon Web Services, Google Compute Engine, OpenStack, or Rackspace Cloud. In other words, data services and applications might now be hosted "in the cloud." Such "virtual" infrastructure or resources can include virtual web servers, load balancers, and databases hosted as software instances running on separate hardware.

There are several reasons commonly cited for building applications for the cloud. Using cloud resources reduces the time required to provision a new virtual infrastructure to effectively zero. Traditionally, it took weeks or even months to acquire, install, configure, network, and image new hardware. Cloud users can launch new instances from an infrastructure provider in a matter of minutes. Another key reason for building for the cloud is the elastic nature of the cloud. When a customer needs more virtual resources, they request more to be provisioned for them. When they are done with the resources, they return them to the provider. The provider charges customers for resources only when they are in use (typically on an hourly basis). Elasticity allows customers to adjust the number of resources they use (and pay for) to match the load on the application. The load on the application may vary according to trends that are short (hourly or daily cycles) or long (growth of the business over months).

Accordingly, there is a need to provide a system which can collect data from virtual infrastructure, monitor and process the data to identify anomalies and potential areas of concern, and report the results to operators of a data service and/or application hosted on the cloud. However, the benefits of the cloud are some of the same things that make the cloud hard to monitor. With virtualized resources, a description of a resource and its behavior is not available via a single source. For example, the infrastructure provider can use Application Program Interfaces (APIs) to provide metadata about a virtual resource within the virtual environment (e.g., where it is located, why type of resource it is, the capacity allocated to the resource, etc.). However, information about what is running inside the virtual container is only available from within that container—such information cannot be provided by querying the infrastructure provider's APIs. Secondly, because of the elastic nature of the cloud, the configuration of an customer application can change very quickly. It is not uncommon for the number (and therefore, aggregate capacity) of resources used by a customer to fluctuate by hundreds per day to accommodate diurnal patterns, or by thousands of resources in a matter of weeks to track business growth. These changes in resources can be driven by demand for the customer's application (e.g., more resources are provisioned if more people are using the application), supply of resources (e.g., a customer may request that additional resources be provisioned only if the price of using these resources fall below a certain threshold), and/or scheduled patterns (e.g., additional resources are provided during expected peak demand times during the day). The monitoring tool must be able to operate within a dynamic environment that is changing faster than can be tracked by human operators.

SUMMARY OF THE INVENTION

In accordance with the disclosed subject matter, systems, methods, and non-transitory computer program products are provided for monitoring and measuring cluster performance hosted by an IaaS provider by means of outlier detection.

Certain embodiments include systems for detecting outlier virtual resources that perform differently from peer virtual resources within a cluster of virtual resources that are expected to perform similarly. The virtual resources may be provided by an independent Infrastructure-as-a-Service (IaaS) provider to an IaaS tenant for operating a widely distributed service. The widely distributed service may be geographically dispersed, part of different communication networks, or disjoint. The IaaS provider may be responsible for selection of resources. An operational capacity of the resources may change substantially and rapidly, and the IaaS tenant may have no direct control over, and limited visibility into, the selection of resources. The system may include a data gateway and an analysis module. The data gateway may be configured to collect substantially live system-level metrics related to the operation of the cluster of resources. The analysis module may be configured to compare the live system-level metrics for resources in the cluster of resources against live system-level metrics for other peer resources in the cluster of resources. The analysis module may be further configured to determine that a candidate resource is an outlier if a difference between the live system-level metrics for the candidate resource and the live system-level metrics for other peer resources in the cluster of resources exceeds a predetermined threshold. The determination that the candidate resource is an outlier may include performing correlation analysis on the candidate resource, performing ANOVA analysis on the candidate resource, or performing regression analysis on the candidate resource.

The embodiments described herein can include additional aspects. For example, the predetermined threshold may based on a resource type of the candidate resource, a resource role of the candidate resource, the live system-level metric being compared, or feedback from the IaaS tenant in response to previously determined outliers. The analysis module may be configured to perform correlation analysis. For example, the analysis module may be configured to compute a correlation matrix for the system-level-metrics for all resources in the cluster of resources. The analysis module may be further configured to sum, for each resource in the cluster of resources, the correlations of the system-level metrics for that resource against the system-level metrics of all other peer resources in the cluster of resources. The analysis module may also be configured to determine that a candidate resource is an outlier if the sum for the candidate resource is more than one quartile away from a median for the sum for all the resources in the cluster of resources. The analysis may be configured to perform ANOVA analysis. For example, the analysis module may be configured to collapse the system-level metrics for all resources in the cluster of resources by removing time labels. The analysis module may be further configured to detect whether there is an outlier by determining whether the collapsed system-level metrics for at least one resource exhibits a substantially different mean and variance than means and variances for other resources by performing ANOVA analysis. If an outlier is detected, the analysis module may be further configured to determine which resource is the outlier using the Tukey HSD test. The analysis module may also be configured to perform regression analysis. For example, the analysis module may be configured to regress, for each resource in the cluster of resources, the live performance-metric data for all other peer resources in the cluster of resources as independent variables onto the live performance-metric data for the resource being analyzed as the dependent variable. The analysis module may be further configured to compute the goodness-of-fit for the regression for each resource in the cluster of resources. The analysis module may be further configured to determine that a candidate resource is an outlier if the goodness-of-fit for the regressions for all other peer resources in the cluster satisfy a pre-defined threshold, but the goodness-of-fit for the regression of the candidate resource does not satisfy the pre-defined threshold. The data gateway may be configured to collect the substantially live system-level metrics at a frequency that is high enough to capture an expected rate of change of the set of resources. For example, the frequency may be once every five minutes.

DESCRIPTION

Figure 1:
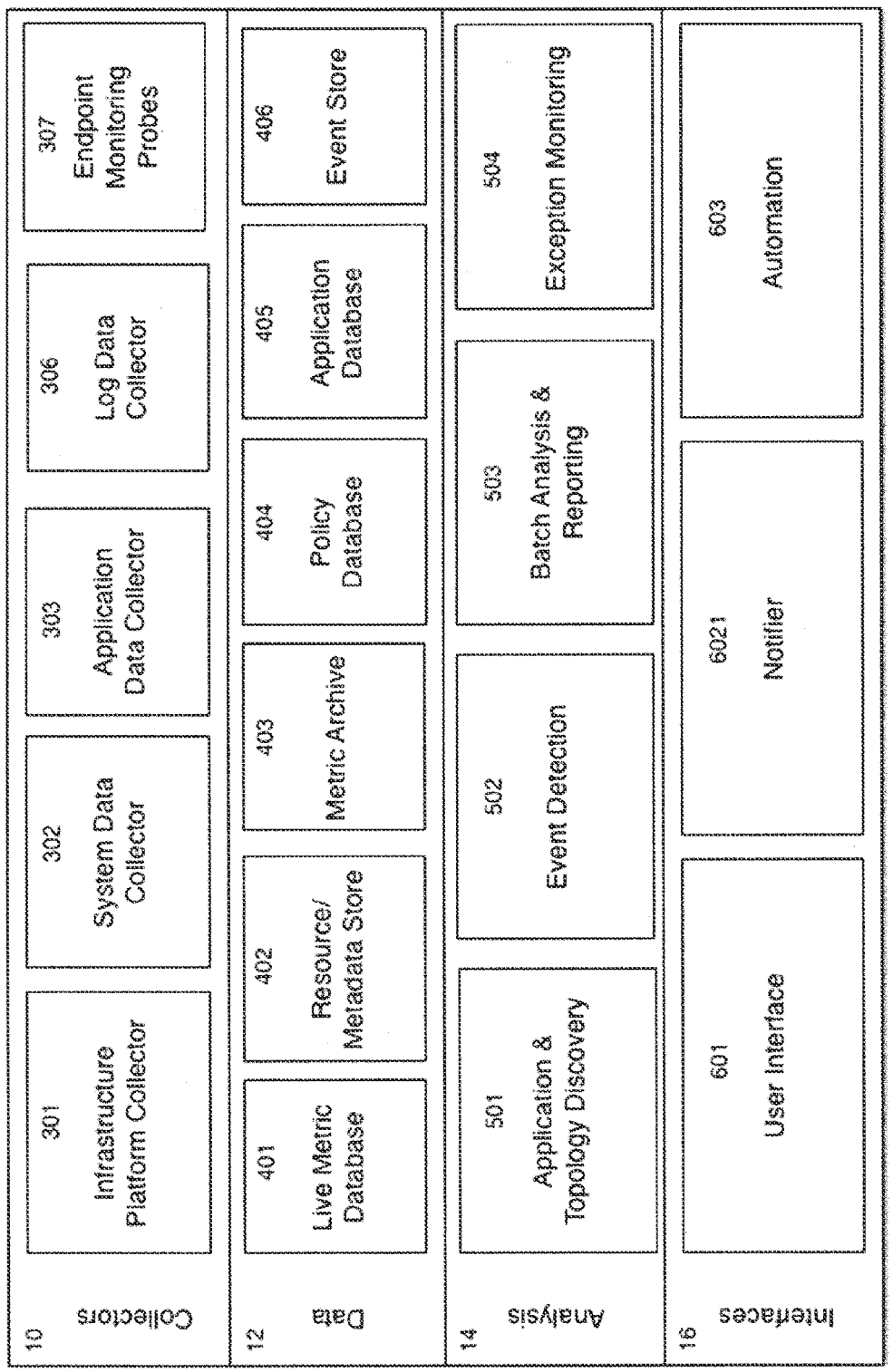
FIG. 1 is a block diagram showing the major components of the monitoring system, according to some embodiments.

The present monitoring system can monitor and analyze cluster performance by detecting outliers in a widely distributed service operated by an Infrastructure-as-a-Service (IaaS) tenant, but deployed on a set of virtual resources controlled by an independent IaaS provider. The set of virtual resources can be organized into clusters in which resources are expected to behave similarly to each other. Virtual resources that do not behave similar to peer resources in the same cluster—i.e., outliers—may be indicative of problems that need to be addressed. The present system can collect performance metric data from virtual resources, and compare the performance of each virtual resource in a cluster with the performance of every other virtual resource in the cluster to detect outliers. This comparison can involve correlation analysis, ANOVA analysis, or regression analysis, as described in further detail below.

The monitoring system can implement a service that can be used by other companies to monitor the performance of their systems, virtual infrastructure, hosted services, and applications. The monitoring system can be hosted in a virtualized multi-tenant infrastructure environment. The system collects inventory and monitoring data from the customer's environment via several methods, analyzes that data, identifies potential issues, stores the data for future retrieval, and notifies the customer when issues occur (or are likely to occur in the future). Customers access the monitoring system user interface via a web browser using standard Internet protocols. The monitoring system notifies customers of issues via electronic mail, SMS, and calls to APIs provided by third party services.

In one embodiment, one example of a customer would be a photo sharing service that operates on top of virtual "cloud" infrastructure. End users leverage the photo sharing service to upload, store, edit, and share digital photographs. Main components of such an application would likely include a set of cloud servers supporting photo upload, a hosted storage subsystem for storing the photos, and a set of cloud servers supporting photo retrieval. Other supporting components could include, for example, various databases (e.g. for authentication, preferences, indexes, etc.) and customer-developed processing code (e.g. to resize photos).

The photo sharing company can configure and use the presently disclosed monitoring system to monitor each of the key components of its photo sharing application (e.g., cloud servers, hosted storage subsystems, databases, application code, and other components). Once monitoring is configured, the monitoring system can begin collecting and analyzing that information and notifying the customer of issues. Staff at the photo sharing company would log on the monitoring system service from their web browsers in order to review the configuration and key metrics related to their environments.

It is to be understood that although the above discussion uses a photo sharing company as an example, this example is meant to be illustrative only—the present disclosure is not limited to any particular application. Also, while the terms "customer" and "user" are both used in the present disclosure, it is to be understood that the two terms are to be considered interchangeable, and that the present disclosure is not limited to a commercial service-provider and customer application. For example, the present disclosure could be used by the same organization/enterprise, or by a governmental entity.

FIG. 1 is a block diagram showing the major components of the monitoring system, according to some embodiments. Specifically, FIG. 1 shows the major components of the system classified into four categories, as outlined in horizontal divisions. Collector modules 10 can capture data from customer environments and transmit that data to the monitoring system; these modules can include Infrastructure Platform Collector 301, System Data Collector 302, Application Data Collector 303, Log Data Collector 306, and Endpoint Monitoring Probes 307. Data modules 12 can provide storage for customer and application information; these modules can include Live Metric Database 401, Resource/Metadata Store 402, Metric Archive 403, Policy Database 404, Application Database 405, and Event Store 406. Analysis modules 14 can evaluate data collected from customer environments; these modules include Application & Topology Discovery 501, Event Detection 502, Batch Analysis & Reporting 503, and Exception Monitoring 504. Interface modules 16 can serve as the user's mechanism for accessing the service; these modules include User Interface 601, Notifier 6021, and Automation 603. As used herein, "modules" can mean any of a hardware component, a software routine, and/or a data service. Each of the above-described modules will be described further in relation to FIGS. 2-9 below.

Figure 2:
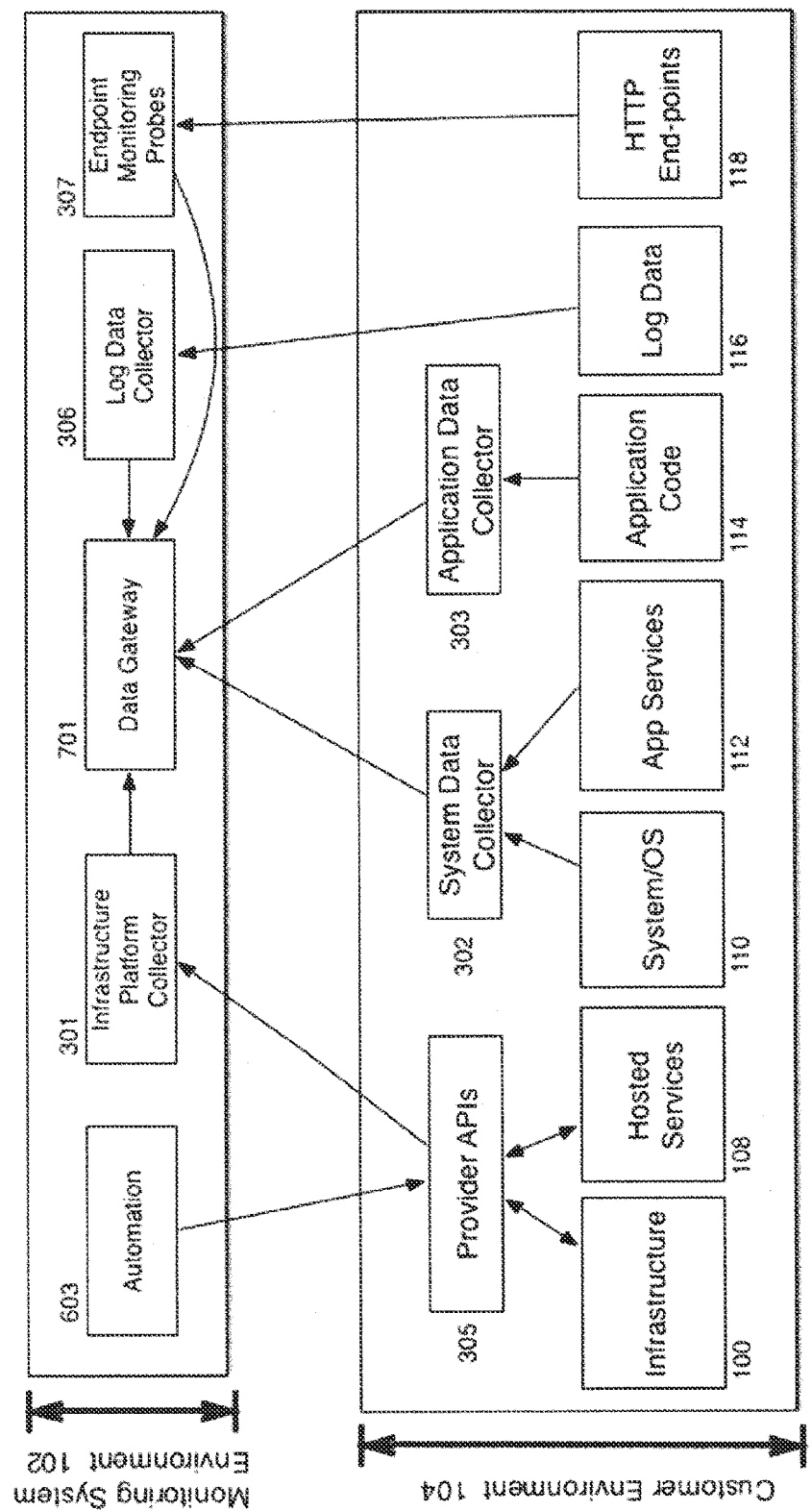
FIG. 2 shows how the technology stack for a cloud-hosted application can be integrated with the presently disclosed monitoring system, according to some embodiments.

FIG. 2 shows how the technology stack for a cloud-hosted application can be integrated with the presently disclosed monitoring system in one embodiment. FIG. 2 shows a Monitoring System Environment 102 which communicates with Customer Environment 104. Customer Environment 104 can host a customer application, which can be composed of collections of App Services 112 (e.g., MongoDB, Apache, etc.), Hosted Services 108 (e.g., ELB, RDS, etc.), and custom Application Code 114. Hosted services 108 can be well-known application building blocks such as databases and web servers. Custom Application Code 114 and App Services 112 can run atop an System/Operating system 110. System/OS 110 can be run in virtual infrastructure, such as that provided by an IaaS vendor, like Amazon Web Services, Google Compute Engine, OpenStack, or Rackspace Cloud. Monitoring System Environment 102 uses various integration points to interact with Customer Environment 104.

In Customer Environment 104, infrastructure Provider APIs 305 can be interfaces provided by a cloud provider to retrieve information about Infrastructure 100 that a customer is using from the cloud provider. Provider APIs 305 can provide an inventory of the virtual resources allocated to the customer. Because of the elastic nature of the cloud, the inventory may change on a minute to minute basis. It is important that the Monitoring System Environment 102 be queried frequently enough to observe fast changes in the infrastructure (e.g., every five minutes). Provider APIs 305 can return data about the behavior of the virtual infrastructure (e.g., CPU utilization, disk I/O rates). Provider APIs also provide data about hosted services (request rate on virtual load balancer, query latency on hosted database). In Monitoring System Environment 102, the monitoring system can use Infrastructure Platform Collector 301 to query Provider APIs 305 on behalf of the customer using a read-only role provided by the customer. The data returned by the Provider APIs 305 can then be normalized and forwarded to the Data Gateway 701, also in the Monitoring System Environment 102. Because these Provider APIs 305 are defined publicly, the monitoring system can fully understand the semantics of the data and corresponding metadata for all results.

To collect data at the operating system level (or metric data), the monitoring system can use a System Data Collector 302 or "agent" installed in each application instance to be monitored on the Customer Environment 104. For example, in one embodiment, the monitoring system can use the open source agent CollectD as the starting point for System Data Collector 302. System Data Collector 302 can also collect data from well-known software services (e.g., Apache or MongoDB). System Data Collector 302 can also use a plugin model to support services. After collecting data, System Data Collector 302 forwards the data to Data Gateway 701 hosted by the monitoring system environment 102. Data Gateway 701 and System Data Collector 302 can use SSL for security. System Data Collector 302 can also include with each message a shared secret, called an API key, to authenticate itself to Data Gateway 701, and/or use hashing for message integrity. Because data is collected by a known agent, the monitoring system understands the semantics of the data and metadata coming from the System Data Collector 302. Again, data at the operating system level can change rapidly on a minute-to-minute basis, and so System Data Collector 302 can be configured to collect this data at a rate fast enough to capture an expected rate of change in this data (e.g., every 5 minutes).

Customer Environment 104 can also include custom Application Code 114, which can be configured to measure and report data that is important to the customer's applications via Application Data Collector 303. Application Code 110 sends any measurements that it wants to monitor with the monitoring service to Data Gateway 701; these measurements can also be sent using SSL, the API key, and hashing as described above. Application Data Collector 303 can be a simple language-specific library provided by the monitoring system or a third-party to simplify the task of formatting and sending message to the monitoring system. Alternatively, the customer may write software which serves as the Application Data Collector 303. Because custom measurements are fully defined by the custom applications, the monitoring system may not know how to interpret custom metrics.

Custom application code and services used by customers can generate lots of data in logs. The monitoring system can accept log data via Log Data Collector 306. Log Data Collector 306 in turn forwards the data to Data Gateway 701. Another source of log data is the infrastructure provider. To collect infrastructure provider logs, Log Data Collector 306 can use Provider APIs 305. Log Data Collector 3076 can be configured to collect log data at a rate frequent enough to capture an expected rate of change in the log data, for example, every five minutes.

Applications to be monitored by the monitoring system are often exposed to their users via one or more HTTP endpoints. Endpoint Monitoring Probes 307 in the monitoring system environment 102 can monitor the health and performance of application endpoints from the perspective of the user. These probes can be located in several geographically distributed locations, for example, Europe, Asia, Africa, North America or South America. Metrics related to the availability (e.g., can the endpoint be contacted?), health (e.g., does the endpoint respond as expected?), and performance (e.g., what is the request latency for the endpoint?) of the customer's application as they appear from the perspective of an end user, among others, can be collected by Endpoint Monitoring Probes 307. Endpoint Monitoring Probes 307 can then forward these metrics to Data Gateway 701. Endpoint Monitoring Probes 307 can be configured to collect these metrics at a rate fast enough to capture an expected rate of change in the metrics, for example, every five minutes.

Monitoring System Environment 102 can also include an Automation Engine 603 that supports the automation of certain tasks on behalf of the customer. For example, based on a condition or schedule, the monitoring system can initiate an action, such as rebooting an instance, provisioning a new instance, or adding disk capacity to a database. In this way, the monitoring system can cause tasks to be performed on resources in Customer Environment 104. The monitoring system can use Provider APIs 305 to modify the customer infrastructure in Customer Environment 104.

To initiate and control actions in Customer Environment 104, the monitoring system can be granted more privileges than the read-only permissions required to query APIs and collect data. If these privileges are granted, the monitoring system can initiate actions on the customer environment based on input from the customer received using the monitoring system's user interface. For example, when the customer clicks an icon in the monitoring system's user interface to snapshot a block device, the monitoring system can first verify that it has sufficient permissions from the customer and can then call Provider APIs 305 to start the action.

Figure 3:
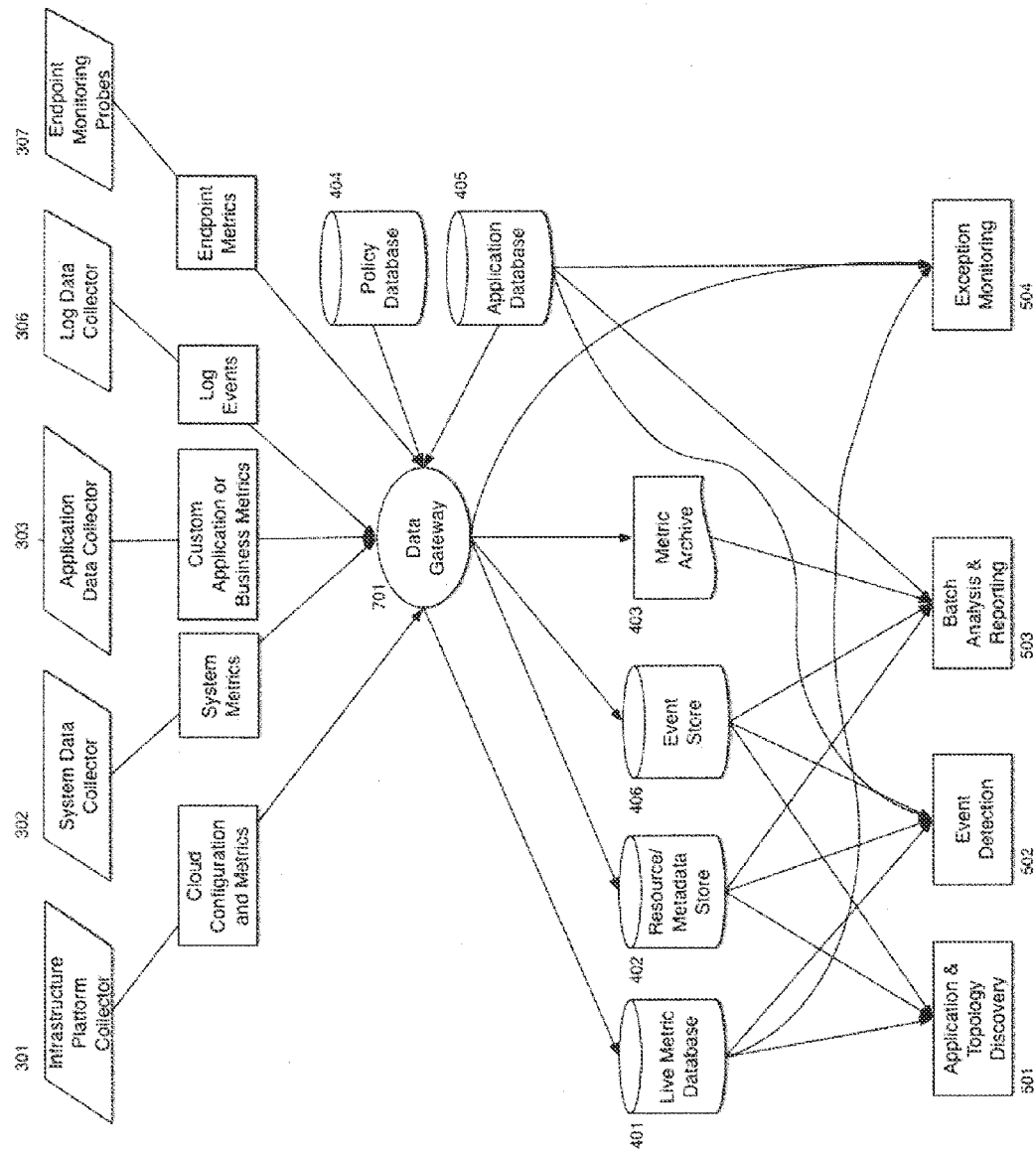
FIG. 3 shows data flows between collectors, data stores and analysis modules in the presently disclosed monitoring system, according to some embodiments.

FIG. 3 shows data flows between collectors, data stores and analysis modules in the presently disclosed monitoring system, according to some embodiments. Specifically, FIG. 3 shows data flows into and within the monitoring service in more detail. The monitoring system can store different types of data. Each data type can be stored in its own data store. The system can also share the data store among several different data stores and even data store technologies.

Data Gateway 701 provides a single ingest service into which data from each of Infrastructure Platform Collector 301, System Data Collector 302, Application Data Collector 303, Log Data Collector 306 and Endpoint Monitoring Probes 307 can be fed. From there, data can be forwarded from Data Gateway 701 to the appropriate data store, as described below.

Live Metric Database 401 can enable rapid storage and retrieval of metrics and other data from the customer environment. The primary contents of the Live Metric Database 401 can be time series of individual metrics. The Database 401 can also store aggregations of the original time series, i.e., aggregated time series which can contain data rolled-up into coarser time granularity for efficient retrieval and presentation of long time scales. If the monitoring system does not back up the Database 401, the monitoring system can instead rely on fault-tolerance of the Database 401 and an Archive 403 for disaster recovery. In one example embodiment, Live Metric Database 401 can be implemented using Cassandra.

Resource/Metadata Store 402 can enable rapid retrieval of resources, properties of resources, and topology information for the customer's application and infrastructure. Resource/Metadata Store 402 can be populated by infrastructure metadata collected by Provider APIs 305 via Infrastructure Platform Collector 301. This infrastructure metadata collected from Provider APIs 305 and stored in Resource/Metadata Store 402 can include (i) infrastructure-provider metadata expressed in a fixed format prescribed by the infrastructure provider characterizing the resources then being used by the customer's application, (e.g., resource type, capacity, etc.), and (ii) operator metadata expressed in arbitrary text specific to, or perhaps supplied by, a particular customer that the customer uses to characterize the resources. This operator metadata can include customer-specific naming conventions for resources, or customer-specific codes or terms establishing security rules and policies (e.g., firewall rules), resource roles (e.g., web-server, load balancer), geography (e.g., Asia, Europe), business function (e.g., Advertising, Customer Support), organizational business unit (e.g., widget 1, widget 2), etc. In short, operator metadata can include customer-specific text that reflects how the customer intuitively thinks about and organizes the resources in its infrastructure. In one embodiment, Store 402 can rely on the ElasticSearch distributed search and analytics engine and can be scaled horizontally by adding additional nodes.

The infrastructure metadata (including one or both of the infrastructure-provider metadata and the operator metadata) can be thought of as including information about an actual state of a virtual resource, or an anticipated state of a virtual resource. An actual "state" of a resource can include information regarding the resource's type (e.g., AWS t1-micro vs. AWS m1-small resource as used in Amazon Web Services (AWS)), the resource's role (e.g., web server vs. load balancer), or an operational status of a resource. The operational status of a resource can include whether the resource is "terminated," meaning that the resource has been de-allocated from the customer's application and is no longer available for use by the customer, or whether the resource is "stopped," meaning that the resource has been temporarily suspended and the customer is being charged a reduced rate, but that the resource can be restarted with minimal delay time. If a resource has been terminated or stopped, the infrastructure metadata can also include information regarding whether this termination or stoppage is prompted by a request from the customer (e.g., because the customer no longer needs the resource), or by the infrastructure provider (e.g., because the resources are needed for other uses, or because the resources have crashed). An anticipated "state" of a resource can include information regarding an expected availability of the virtual resource in the future (e.g., a notice by the infrastructure provider that the resource will be decommissioned as of a certain date), or information regarding whether the resource is scheduled for termination and/or stopping at some point in the future.

The difference between Live Metric Database 401 and Resource/Metadata Store 402 is the type of data stored about the customer's application/infrastructure. The Resource/Metadata Store 402 can record metadata about the resources in the customer's system, such as instance type or location. On the other hand, Live Metric Database 402 can record the instantaneous behavior of the customer's system, like memory usage, network bandwidth usage, request latency, etc. Resource/Metadata Store 402 can be populated by information from Provider APIs 305, while the Live Metric Database 402 can be populated by information from System Data Collector 302, Application Data Collector 303, Log Data Collector 306, and/or Endpoint Monitoring Probes 307.

Event Store 406 can be used to store events. Events can be a type of data that describes discrete occurrences or changes in the system. Events can cover much of the activity of the customer application that cannot be captured by additional time series metrics or measurements. These events can be stored in the Event Store 406. In one example embodiment, the monitoring system can store events in ElasticSearch for fast querying and filtering.

Metric Archive 403 can enable long-term preservation and batch analysis of customer metric data. It can also serve as a foundation for disaster recovery. Metric data can be stored in raw, uncompressed, unencrypted format in an object storage system. In one example embodiment, metric data can be stored using the JSON encoding format.

Policy Database 404 can include both customer-defined and default logic against which Exception Monitoring System 504 (described in further detail below in relation to FIG. 5) can evaluate metrics and events. Customer-defined policies are created and modified via the monitoring system's user interface. In one example embodiment, the monitoring system can use a hosted version of MySQL for Policy Database 404.

Application Database 405 can store customer-specific preferences and configurations defined by the customer. These preferences and configurations can include things such as the definition of groups (and subgroups and clusters). Database 405 can also record "dashboards" that the customer defines, which are preconfigured displays of metrics and display settings that are of particular interest to the customer. Database 405 can also record the customer's notification configurations and preferences. In one example embodiment, the monitoring system can use a hosted version of MySQL for this store.

The monitoring system can also perform a number of analyses on the data collected from a customer's infrastructure. These analyses are shown at the bottom of FIG. 3.

Application and Topology Discovery 501 can analyze data and metadata from the customer's application to establish a service architecture of the roles and relationships between components of the customer's environment. This service architecture of established relationships can be used to set appropriate defaults for the customer's monitoring system settings and improve the relevance of the monitoring system's analysis. This service architecture can approximate how the customer intuitively thinks about and organizes the resources in its infrastructure, as illustrated in the above-discussed examples. The customer can also declare their service architecture to improve on what the monitoring system discovers. The most common relationships between components of the customer's environment are "groups" and "clusters".

A "group" is a set of resources (possibly of different types, e.g., servers, databases, load balancers, data services, etc.) that are considered as a single unit. Customers can define groups to help organize resources in the monitoring system to match how they are organized in their organization. Customers can define groups, for example, based on deployment type (Production versus Staging), architectural subsystem (such as media transcoder or ad server), geographic location (US-east or Europe), or organizational boundaries (Finance or HR).

A "cluster" is a special type of group in which all resources are expected to behave in a similar way. When clusters are defined, the monitoring system can perform additional types of analysis. A "Production" group would likely not be a cluster because it would include a variety of resources performing a variety of functions. On the other hand, a "Ad Server" group would be more likely to be a cluster because it is probably a set of instances (e.g., a set of web servers) all performing the same function with roughly similar workloads in the customer's application. Defining a "group" as a "cluster" can enable special types of analysis: for example, since we expect all members of a cluster to behave similarly, the monitoring system can be configured to detect when one member of a cluster is not behaving in the same way as its peers, and notify the customer accordingly.

Groups and clusters can be nested arbitrarily. For example, a "Production" group might have child groups for "Ad Servers" and "Billing System". The "Ad Servers" group may be defined to be a cluster. Within the "Ad Servers" cluster, there may be an additional categorization of "US" and "Europe" clusters that describe where they are hosted. Under the "Billing System" group, there may be subgroups for "USD" and "Euro" to reflect the currency type that different components are designed to support. A plurality of clusters can also be nested within a group.

Application and Topology Discovery 501 can use a number of techniques to automatically infer a service architecture of the customer's application based solely on the infrastructure metadata, without human operator modeling input or information regarding the actual physical network connectivity between resources. In one embodiment, Application and Topology Discovery 501 can retrieve infrastructure metadata from Resource/Metadata Store 402 and search the operator metadata embedded in this infrastructure metadata for patterns in order to identify "groups" of resources. For example, naming conventions in the operator metadata (e.g., "Mongo-1", "Mongo-2", "Mongo-3") can indicate a group of similar resources. Security group (i.e., firewall) rules can also show relationships between different components. These security group rules can define how other instances or resources may contact the target instance of resource. For example, this can be defined in terms of which network ports are open to the network. Alternatively, security group rules can define what portions of the network can contact the target resource (e.g., by IP address). In yet another alternative, security group rules can be defined in terms of what other security groups can contact the target resource. If different resource instances have the same security group (firewall rules), it is likely that these resource instances serve a similar purpose and should be grouped together. Application and Topology Discovery 501 can also use deployment patterns to infer service architecture. For example, the set of instances behind, or being serviced by, a load balancer can serve the same role and configuration, and therefore should be grouped together. The deployment pattern can also be used to infer hierarchies: the same set of instances behind the load balancer could be nested within a larger group. In addition, Application and Topology Discovery 501 can use the unique fingerprint of well-known technologies and services (such as MongoDB, MySQL, Apache, etc.) to identify commonly-used server software and put resources which use the same software into the same group or cluster. These unique fingerprints can be a well-known port on the resource that is open to the network. For example, HTTP traffic typically runs on port TCP 80, or sometimes on port 8080. HTTPS is usually run on TCP 443. Alternatively, the monitoring system can probe ports of resources and try to deduce the resource type by the response it receives. Some responses from resources can include information regarding what server/version the resource is running. In yet another alternative, the monitoring system could look at traffic originating from a target resource. By observing the requests or queries originating from the target resource, the monitoring system might be able to deduce something about the target resource. More generally, the problem of inferring the service architecture can be viewed as a clustering problem. Given metadata (including infrastructure metadata and operator metadata) for a collection of resources, Application and Topology Discovery 501 can search for clusters of similar resources as defined by similarity in metadata. One possible approach to this problem is using K-mean clustering algorithm.

Groups can further be classified as clusters based on the dynamic performance of resources in the group. The Application and Topology Discovery 501 retrieves performance related data (e.g., memory usage, I/O patterns, and network usage) from Live Metric Database 401. Approaches for performing cluster outlier detection analysis (described later in relation to Analysis Engine 5032) can be modified to detect when resources are behaving similarly instead of when resources are behaving differently. If the resources are of the same type, and they are behaving similarly, these resources can be classified as a cluster.

Because of the dynamic nature of the cloud and the iterative design approach employed by many development teams, the service architecture detected via Application and Topology Discovery 501 can itself be dynamic. The process can detect small incremental changes in the infrastructure (such as when virtual resources are provisioned or retired) and more significant changes (such as when the service architecture of the application changes). To handle these small and large changes, the Application and Topology Discovery process 501 is run periodically. Changes in the service architecture are often related to changes in resource metadata (as recorded in Resource/Metadata Store 402) and changes in resource inventory and status (as recorded in Event Store 406).

Event Detection 502, Batch Analysis and Reporting 503, and Exception Monitoring 504 are other analysis modules. Batch Analysis and Reporting 503 is shown in more detail in FIG. 4. Event Detection 502 and Exception Monitoring 504 are shown in more detail in FIG. 5.

Figure 4A:
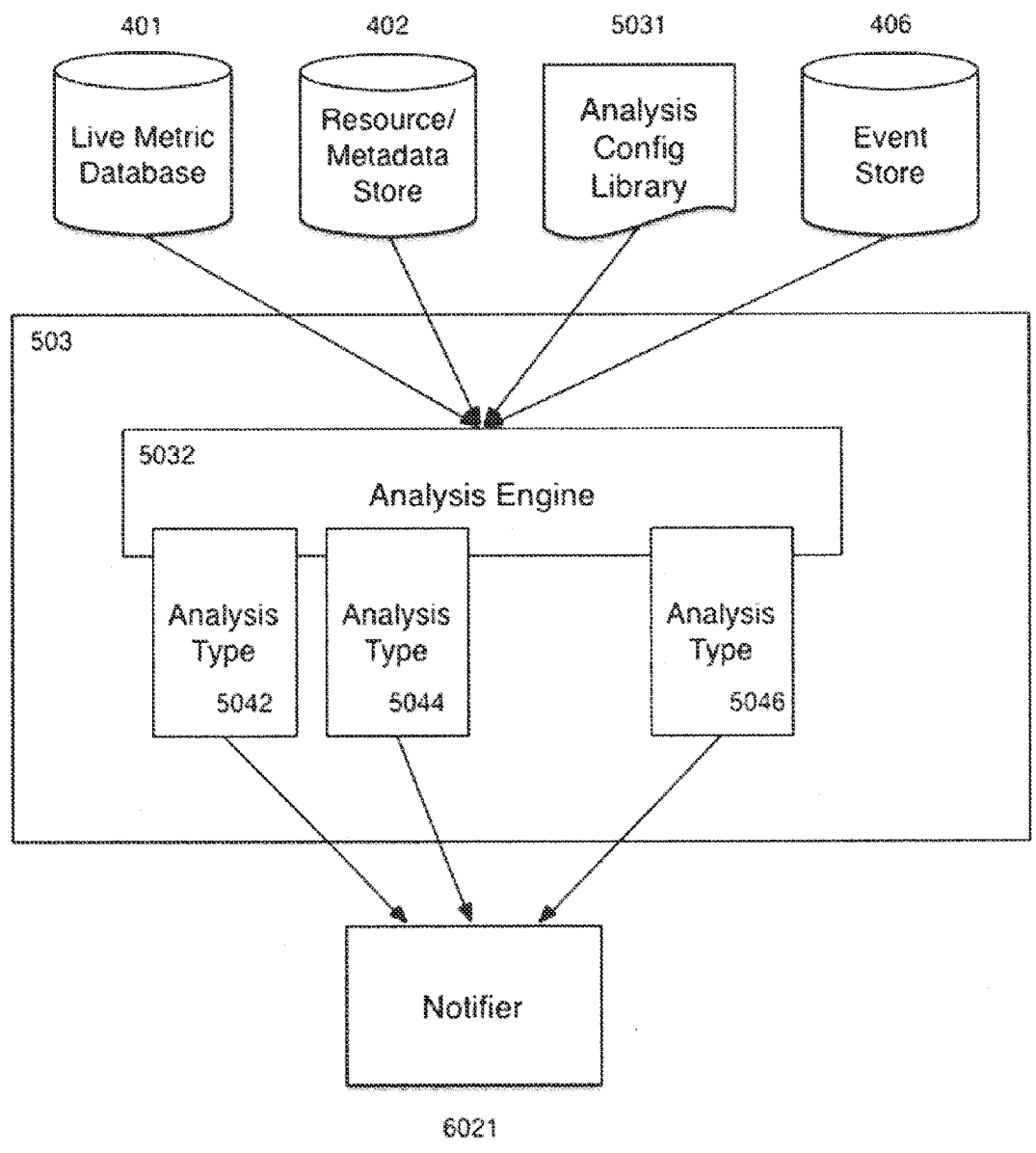
FIG. 4A shows the batch analysis and reporting module of the presently disclosed monitoring system, according to some embodiments.

FIG. 4A shows the batch analysis and reporting module of the presently disclosed monitoring system, according to some embodiments. Specifically, FIG. 4A shows the Batch Analysis and Reporting analysis module in more detail. The main component of this module is the Analysis Engine 5032. Analysis Engine 5032 can be responsible for directing the analysis functionality. Analysis Engine 5032 can pull data from three sources: Live Metric Database 401, Resource/Metadata Store 402, and Event Store 406. Live Metric Database 401, Resource/Metadata Store 402, and Event Store 406 were described previously. As discussed above, Live Metric Database 401 can provide a combination of historical performance data and current performance from the customer environment. Resource/Metadata Store 402 can provide infrastructure inventory and topology.

Analysis Engine 5032 can also rely on Analysis Config Library 5031, which can include definitions of metrics, performance patterns, best practices, and failure modes used by Analysis Engine 5032 to perform targeted analysis of the customer environment. Analysis Config Library 5031 can provide a repository for storing how to make general analysis techniques applicable to specific resource types. For example, it can record which metrics are important for analysis, describe thresholds for absolute and relative magnitude for changes to be interesting, and record rules for classifying the state of a resource based on the resource's measured behavior.

In some embodiments, Analysis Config Library 5031 can be pre-populated based on the best practices from experienced practitioners of cloud systems. For example, the library can define model analysis configurations for various combinations of resource type, service type, and/or system/service metric that the customer is expected to find most relevant and interesting. For instance, the library can define model analysis configurations for when the customer is interested in monitoring request count on a load balancer or messages in a queue service. Such a model analysis configuration can consist of the set of analyses that should be run for that combination of resource type, service type, and/or system/service metric, configuration parameters for the algorithms, and semantic data about the metric. An example of a configuration parameter is the statistical confidence interval for one of the statistical steps of the algorithm. An example of semantic data is the instruction that the metric "resource exhaustion" is only of interest if it is predicted to happen within 3 days, or that an anomaly is only interesting if the absolute magnitude is 1 MB/s. By pre-populating Analysis Config Library 5031 with best practices from experienced practitioners, the monitoring system can suggest to new customers the most relevant and intuitive configurations for monitoring and displaying the appropriate data for their application. While customers can always customize what metrics they want to measure and how they want to view it, the Analysis Config Library 5031's pre-populated model configurations can make it significantly easier for customers to quickly customize the monitoring system for their needs. The functionality of Analysis Config Library 5031's model analysis configurations are discussed in more detail with regard to User Interface 601 and FIG. 6 below.

Analysis Engine 5032 can perform several different analyses (5042, 5044, 5046, etc.) to identify risks to the customer application and predict problems. Some of these analyses are described in more detail below. Most analysis techniques analyze data related to a single customer. In some embodiments, however, the Analysis Engine 5032 can also perform some analyses across multiple customers to measure system-wide performance and availability of a cloud provider's infrastructure. When Analysis Engine 5032 produces a result, it can send the result to a Notifier 6021 that can be responsible for forwarding the result appropriately.

Six types of analyses are described below: anomaly detection analysis, cluster outlier detection analysis, resource exhaustion prediction analysis, host contention detection, bottleneck identification, and cluster utilization analysis.

One analysis that can be performed by Analysis Engine 5032 is anomaly detection. Generally, many metrics are expected to be relatively stable in value. Sharp variations often indicate problems. For these metrics, the monitoring system can analyze the data for transient changes and permanent shocks. Change detection can be more challenging in dynamic environments, which is typical of applications deployed in the cloud. Metrics in dynamic environments can change due to periodic (e.g., daily, hourly) patterns or long term changes (e.g., growth or decline).

Figure 4B:
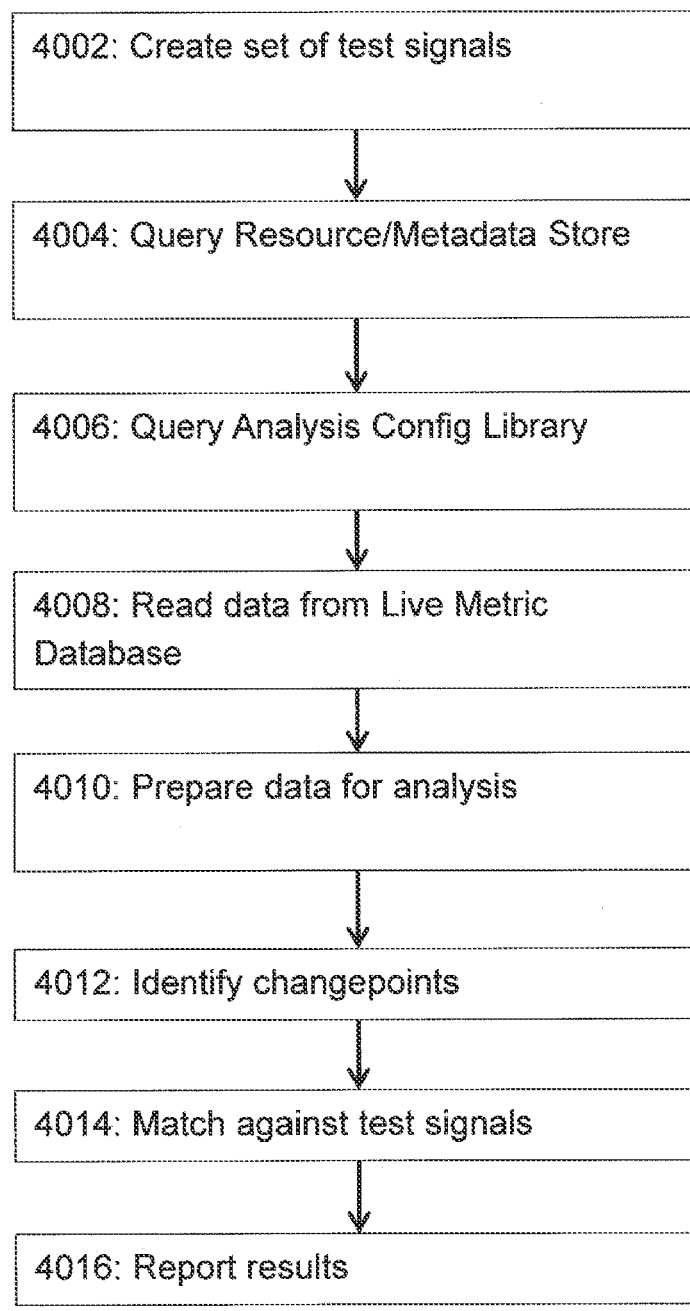
FIGS. 4B-4I show flowcharts depicting data analyses that can be performed by the batch analysis and reporting module, according to some embodiments.

FIG. 4B shows a flowchart depicting data analyses that can be performed by the batch analysis and reporting module, according to some embodiments. One example algorithm for detecting anomalies is depicted in the flowchart on FIG. 4B. In step 4002, the monitoring system can create a set of test signals with shapes that are to be detected. The set can include a spike up, spike down, step up, and step down. In step 4004, the analysis engine can query the Resource/Metadata Store for the set of resources in the customer environment. In step 4006, the analysis engine can query the Analysis Config Library 5031 for the metrics that should be analyzed and any special configuration or instructions that are required for analyzing that type of signal. An example of such a special configuration or instruction can be a minimum magnitude of change that the signal must exhibit before identifying an anomaly. In step 4008, the analysis engine can read data regarding how a resource or metric is behaving from Live Metric Database 401. In step 4010, the analysis engine can prepare the signal for analysis. For example, if the signal is stationary, the analysis engine can simply analyze the raw signal. If the signal is trend stationary, the analysis engine can analyze the first difference of the signal. If the signal is periodic, the analysis engine can decompose the signal into season, trend, and random components. In step 4012, the analysis engine can run change detection on the prepared signal to identify the set of potential points of interest (changepoints) for analysis. Changepoints are determined based on changes in the mean or variance of the signal. In step 4014, the analysis engine can, for each changepoint, (i) compute the Pearson correlation of the signal against each of the test signals, (ii) identify the test signal with the highest correlation to the signal, (iii) if the correlation does not meet some threshold, stop, and (iv) record the offset in the signal and the best pattern match. For each pattern match that was detected, the analysis engine can then describe the change. For example, if the signal matches a spike pattern, the analysis engine can extract the magnitude of the spike compared to the normal parts of the signal. If the signal matches a step pattern, the analysis engine can extract the magnitude of the change (for trend stationary signals, spikes in the first difference correspond to steps in the original signal). The analysis engine can also apply any additional checks called for by the Analysis Config Library 5031 for the given resource type and metric. For example, the analysis engine can ensure that the magnitude of the change is significant relative to the variance of the signal. Or, the analysis engine can ensure that the magnitude of the spike is truly unique within the signal. Finally, in step 4016, the analysis engine can score the severity of each change, and report any pattern changes that score over a given threshold.

Another type of analysis that can be performed by the Analysis Engine 5032 is cluster outlier detection analysis. As discussed above, the customer's application topology can be composed of "clusters" of resources that are expected to behave in a correlated manner. Cluster outlier detection analysis correlates behavior across the cluster. If the behavior of any cluster member deviates from its peers, that member is flagged as potentially faulty. For example, a cluster of web servers all used for ad serving should generally be expected to behave in a similar manner. However, one web server may deviate from its peers (e.g., have significantly slower response times, or have a much longer backlog of requests) because it was incorrectly configured in the last software update, or because the load balancer that is responsible for distributing loads across web servers is not distributing loads evenly. Several algorithms for detecting this type of issue is presented next. The monitoring system can combine results from multiple analyses to achieve greater confidence in its combined analysis. Options for combining results can include majority or consensus.

Figure 4C:
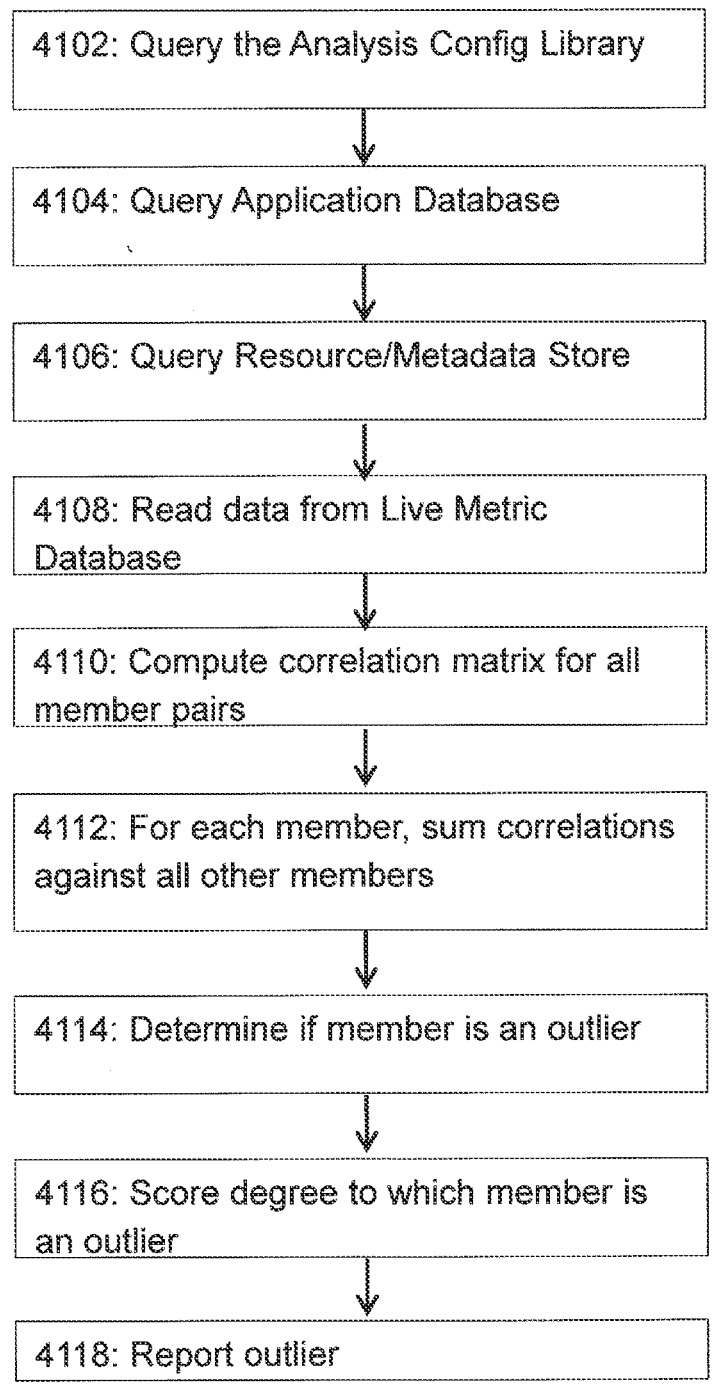

FIG. 4C shows a flowchart depicting data analyses that can be performed by the batch analysis and reporting module, according to some embodiments. One example algorithm for performing cluster outlier detection analysis is depicted in the flowchart in FIG. 4C. In step 4102, the analysis engine can query Analysis Config Library for the metrics that should be analyzed across a cluster. In step 4104, the analysis engine can query Application Database 407 for the set of clusters in the customer environment. In step 4106, the analysis engine can query Resource/Metadata Store 402 to determine the member resources in each cluster. In step 4108, the analysis engine can read data from Live Metric Database 401 for live performance-metric data for all members. In step 4110, the analysis engine can compute a correlation matrix for all member pairs. For example, if there are N signals corresponding to N members, the correlation matrix would be an N by N matrix where the entry on row i, column j is the correlation between signal i and signal j. In step 4112, the analysis engine can sum, for each member, the correlations against all other members, i.e., sum up the rows of the correlation matrix to compute a total for each signal. In step 4114, the analysis engine can determine if the sum of correlations for one member is an "outlier," i.e., is significantly different from its peers. The Inter-Quartile Range (IQR) method for outlier detection can be used. The Inter-Quartile Range method allows the present system to detect outliers by determining a difference between upper and lower quartiles of a statistical distribution. In step 4116, the analysis engine can score the degree to which the member is an outlier. Finally, in step 4118, the analysis engine can report the outlier to the Notifier 6021.

Figure 4D:
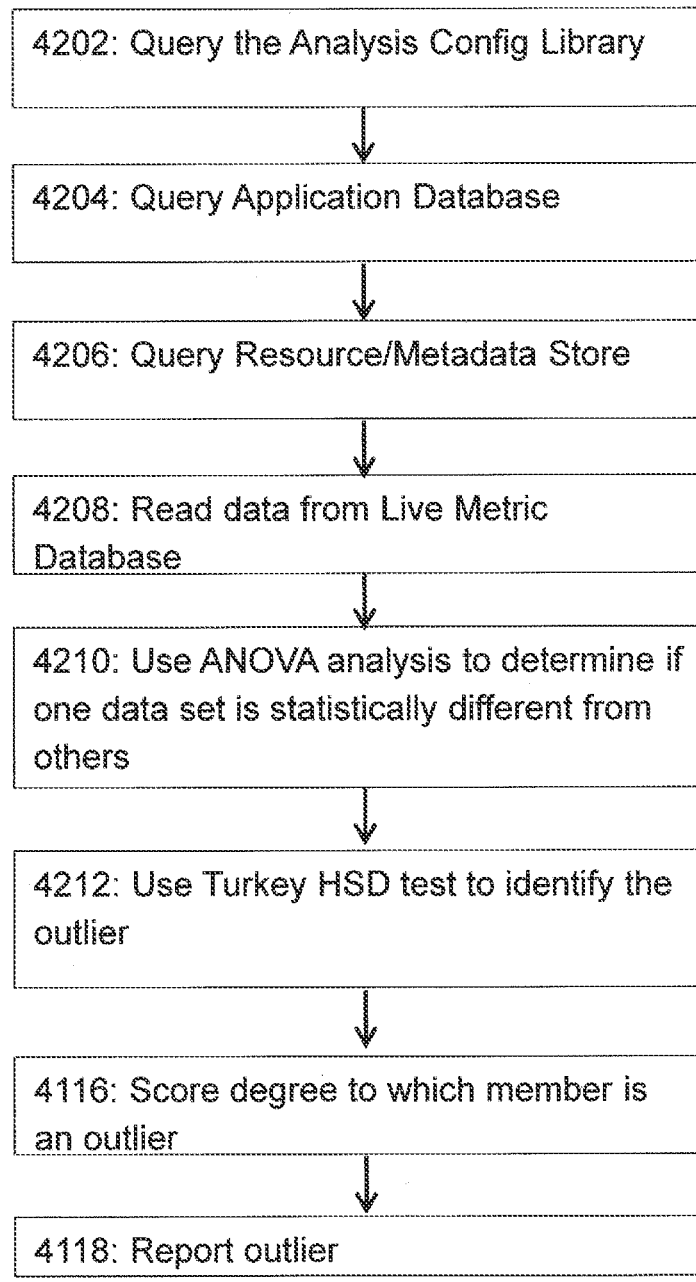

FIG. 4D shows a flowchart depicting data analyses that can be performed by the batch analysis and reporting module, according to some embodiments. Another example algorithm for performing cluster outlier detection analysis is depicted in the flowchart in FIG. 4D. In step 4202, the analysis engine can query Analysis Config Library for the metrics that should be analyzed across a cluster. In step 4204, the analysis engine can query Application Database 407 for the set of clusters in the customer environment. In step 4206, the analysis engine can query Resource/Metadata Store 402 to determine the member resources in each cluster. In step 4208, the analysis engine can read data from Live Metric Database 401 for live performance-metric data for all members. In step 4210, the analysis engine can use Analysis of Variance (ANOVA) analysis to determine if one data set is statistically different from the others. ANOVA analysis refers to analysis that determines whether samples are drawn from statistically different populations by comparing multiple data sets. In general, the present system collapses time series data, which removes the notion of time from the data. The present system then determines whether the mean and variance of one series is statistically different from the means and variances of other series to determine whether there is an outliner. In step 4212, if the ANOVA analysis indicates there is an outlier, the analysis engine can use the Tukey HSD test to identify the outlier. The Tukey HSD test refers to a technique that also determines whether samples are drawn from statistically different populations. In contrast to ANOVA, Tukey determines pairwise differences between samples. In some embodiments, the present system uses Tukey analysis to identify a particular outlier, after using ANOVA analysis to determine the existence of an outlier. In step 4216, the analysis engine can score the degree to which the member is an outlier. Finally, in step 4218, the analysis engine can report the outlier to the Notifier 6021.

Figure 4E:
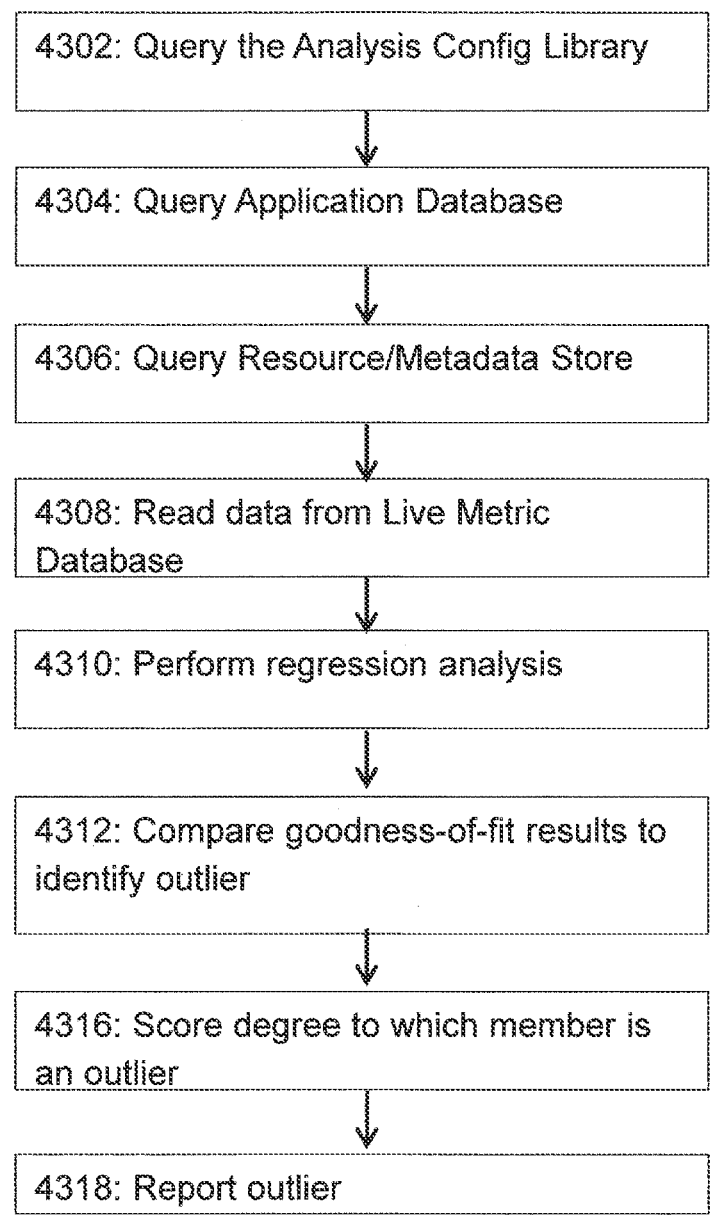

FIG. 4E shows a flowchart depicting data analyses that can be performed by the batch analysis and reporting module, according to some embodiments. Yet another example algorithm for performing cluster outlier detection analysis is depicted in the flowchart in FIG. 4E. In step 4302, the analysis engine can query Analysis Config Library for the metrics that should be analyzed across a cluster. In step 4304, the analysis engine can query Application Database 407 for the set of clusters in the customer environment. In step 4306, the analysis engine can query Resource/Metadata Store 402 to determine the member resources in each cluster. In step 4308, the analysis engine can read data from Live Metric Database 401 for live performance-metric data for all members. In step 4310, the analysis engine can perform the following regression analysis: for each member, regress all other members as independent variables onto the member being analyzed as the dependent variable. In step 4312, the analysis engine can record the goodness-of-fit for each regression. After all regressions are complete, the analysis engine can compare the goodness-of-fit results. If all but one regressions show a good fit (as defined by some threshold), the analysis engine can consider the member that does not produce a good regression the outlier. In step 4316, the analysis engine can score the degree to which the member is an outlier. Finally, in step 4318, the analysis engine can report the outlier to the Notifier 6021.

All of the cluster outlier detection analyses described above in relation to FIGS. 4C-4E can also be modified to detect when resources are behaving similarly to one another rather than differently from each other. Detecting when resources are behaving similarly can be useful when inferring how to characterize resources into clusters based on dynamic performance of said resources (discussed previously in relation to Application and Topology Discovery 501). For example, the algorithm in FIG. 4C can be adapted such that, instead of determining if the sum of correlations for one resource is an "outlier" (i.e., significantly different from its peers), the algorithm can classify a group of resources as a cluster if the entries in the correlation matrix, or the sum of correlations for each resource in the group, is above a certain threshold. The algorithm in FIG. 4D can be adapted such that resources in a group are classified as a cluster if the ANOVA analysis indicates that there is no outlier among these resources. The algorithm in FIG. 4E can be adapted such that resources are classified into a cluster if the goodness-of-fit results for all regressions are above a certain threshold.

Another type of analysis that can be performed by the analysis engine is resource exhaustion prediction analysis. Some resources, like memory and disk space, have a hard limit. This analysis estimates when important resources will be exhausted using historical trends of resource usage.

Figure 4F:
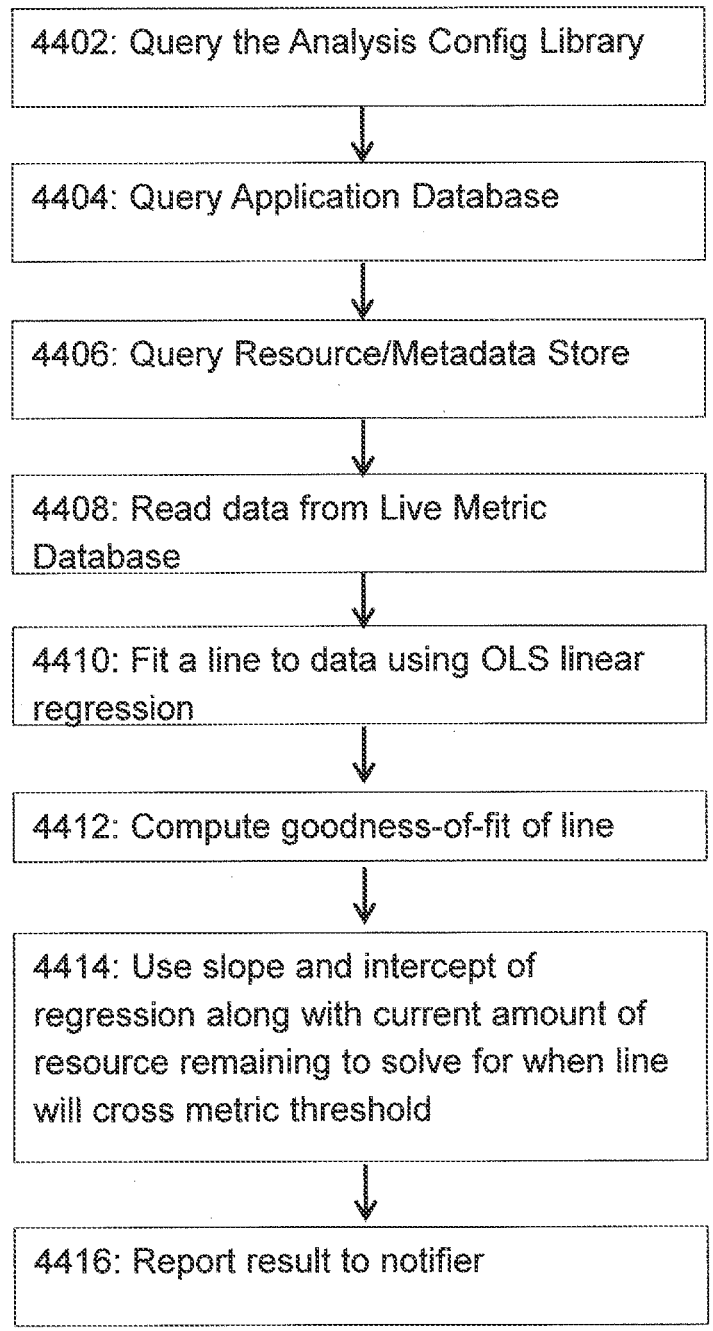

FIG. 4F shows a flowchart depicting data analyses that can be performed by the batch analysis and reporting module, according to some embodiments. One example algorithm for performing resource exhaustion prediction analysis is depicted in the flowchart in FIG. 4F. In step 4402, the analysis engine can query Analysis Config Library 5031 for the set of resources (and their corresponding metrics) that should be analyzed. In step 4404, the analysis engine can query Application Database 405 to determine the hard limit for each metric. In step 4406, the analysis engine can query Resource/Metadata Store 402 for the set of resources used by the customer. In step 4408, the analysis engine can query Live Metric Database 401 for the data that measures the consumption of the resource. In step 4410, the analysis engine fits a line to the data using, for example, Ordinary Least Squares (OLS) linear regression. In step 4412, the analysis engine computes the goodness-of-fit of the line (i.e., the $R^2$ value). If the line fit is below a predetermined threshold, the analysis engine can stop the analysis. In step 4414, the analysis engine can use the slope and intercept of the regression along with the current amount of the resource remaining to solve for when the line will cross the metric threshold. In step 4416, if the analysis engine estimates that the resource will be exhausted within some specified amount of time, the analysis engine can report the result to Notifier 6021.

Another type of analysis that can be performed by the analysis engine is host contention detection. This type of analysis looks for signs that the physical machine of the provider on which the customer's virtual resource is hosted is experiencing problems (e.g., is contended or is under high load from other tenants), such as that other virtual machines running on the same physical host are impacting the customer's application instances. Detecting when a physical machine on which a resource is being hosted is experiencing problems is at once useful and uniquely challenging in the cloud context. It is useful because if the customer knows that a virtual resource's physical host is experiencing problems, the customer can terminate that virtual resource and ask to be allocated a new virtual resource. When the infrastructure provider responds by allocating a new virtual resource, this new resource would likely be hosted on another physical host, one that probably does not suffer from whatever problem is affecting the original physical host. In some embodiments, the monitoring system can be configured to suggest just such a course of action to the customer. However, detecting problems with physical hosts can also be challenging in the cloud context because customers and the monitoring system do not have direct visibility into the operation, identity, location, or configuration of the physical hosts. Whereas in traditional infrastructure implementations a monitoring system might simply query the physical host directly to determine whether it is experiencing problems, a cloud monitoring system does not even know the identity of the physical machine that is hosting the customer's resource, much less how it is configured or where it is located. Instead, the cloud monitoring system must indirectly infer that the physical host is experiencing problems using the approaches described herein.

Three metrics can be relevant to this type of analysis: (i) a "CPU steal metric" that is related to the amount of time that a virtual machine is forced to "wait involuntarily" while the CPU is busy processing other tasks, for example for other customers, (ii) a "CPU utilization" metric that is related to the degree to which the CPU's available processing time and power is being utilized, and (iii) a "CPU idle" metric that is related to the amount of time in which an application has access to the CPU, but has no task for the CPU to perform. These metrics can be standard metrics reported by the System Data Collector 302.

Figure 4G:
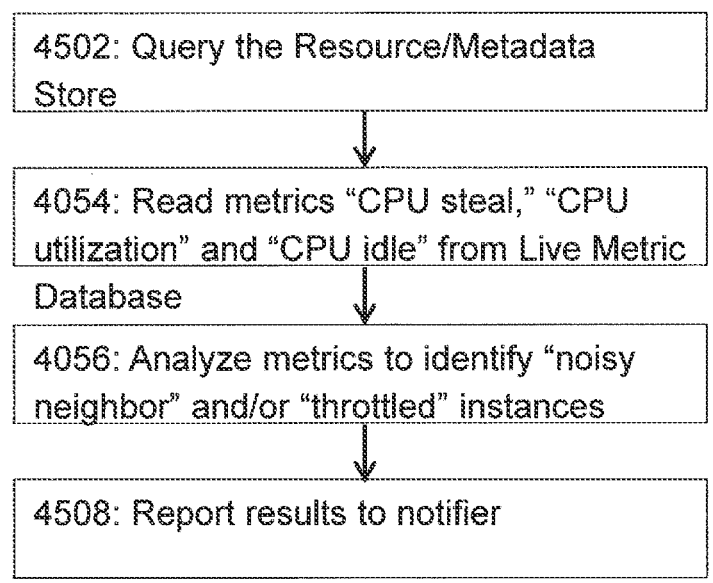

FIG. 4G shows a flowchart depicting data analyses that can be performed by the batch analysis and reporting module, according to some embodiments. One example algorithm for performing host contention detection is depicted in the flowchart in FIG. 4G. In step 4502, the analysis engine can query Resource/Metadata Store 402 for all instances in the customer environment running System Data Collector 302 (because this analysis requires data only reported by System Data Collector 302, or the "agent"). In step 4504, the analysis engine can query Live Metric Database 401 for the three types of metrics discussed above: CPU steal, CPU utilization, and CPU idle. In step 4506, the analysis engine can analyze these metrics. For example, the analysis engine can compute the mean of CPU steal across time. If the CPU steal mean is greater than some threshold, the analysis engine can label the instance as having a "noisy neighbor," meaning the CPU on which the customer's application is running is also running another application (e.g., for another customer) that is consuming a large share of the CPU's resources. As another example, the analysis engine can compute the percentage of time that the resource is busy using the CPU utilization metric. If the percentage of time a resource is busy is above some threshold, and the CPU steal mean is greater than some threshold, the analysis engine can label the resource as "throttled." Similar thresholds and labeling techniques can be done for the CPU idle metric.

In some embodiments, the thresholds for CPU steal, CPU utilization and CPU idle can be stored in Analysis Config Library 5031. These thresholds can be pre-programmed into the monitoring system based on experienced practitioners' judgment, or can be set or modified by a customer. These thresholds can also be programmed based on an expected performance or even based on a Service Level Agreement (SLA) established between the customer and an infrastructure provider, which guarantees a certain level of performance for the resources being provided to the customer. If the thresholds are based on expected performance or based on a SLA, the host contention analysis described herein can be used to detect violations in which the infrastructure provider fails to provide the expected level of performance or the level of performance that it had promised to provide for the customer. In other embodiments, these thresholds can be based on analysis of CPU steal, CPU utilization or CPU idle metrics for other resources that are expected to behave similarly to the resource being analyzed. Consider, for example, a scenario in which the monitoring system is monitoring five web servers that are similarly configured, perform similar roles, and are expected to perform similarly. If one web server begins to exhibit significantly different CPU steal, CPU utilization, and/or CPU idle metrics than the other four, the monitoring system can infer with a reasonable degree of confidence that one problematic virtual web server is being hosted on a physical host that is underperforming (e.g., is contended or is under high load from other tenants). In yet other embodiments, the thresholds can be set based on historical performance of the virtual resource being analyzed. If the resource exhibits significantly lower performance than before, the monitoring system can again infer that the physical machine on which the virtual resource is hosted is experiencing problems (e.g., is contended or is under high load from other tenants). In step 4508, the analysis engine can report the result to Notifier 6021.

While the above discussion was centered around CPU steal, CPU idle and CPU utilization metrics, it is to be understood that other performance related metrics can also be analyzed using the techniques described above to detect host contention. For example, just as the CPU is a shared resource in a virtualized environment, the network interface and the hard disk are often shared resources. When either of those resources are over-provisioned, the amount available for use by the virtual instance may be less than what is available on other similarly sized instances for which those resources are not over-provisioned. To detect if a resource is over-provisioned, one may use a cluster outlier analysis, as described elsewhere. In a cluster, if one member is reporting much less network or disk performance, it may be due to other virtual instances on the same physical host also using some of those resources.

In addition to the algorithms described above, the responsiveness of Provider APIs 305 can be a proxy for the general health and availability of the provider infrastructure. If the Provider API 305 for a particular virtual resource returns either an error code, incorrect or nonsensical metadata, an excessively delayed response, or some other problematic response, the monitoring system can conclude that there are problems with one or more of the cloud provider services, or there is a problem with that virtual resource. An example of problems with one or more cloud provider services may be network connectivity issues within a given data center. An example of a problem with that virtual resource may be that the physical machine on which that virtual resource is hosted is overly burdened with other customers' applications, may be improperly configured, or may be experiencing some other problem not directly visible to the customer or the monitoring system. In this way, the monitoring system can use the status of API requests across all customers to gauge the health of the provider. The monitoring system can report the error rate on a per-provider, per-service, and/or per-region basis.

Another type of analysis that can be performed by the analysis engine is bottleneck identification. This analysis can identify resources that are busy, as measured by some utilization metric. These resources can be candidates for scaling up or out.

Figure 4H:
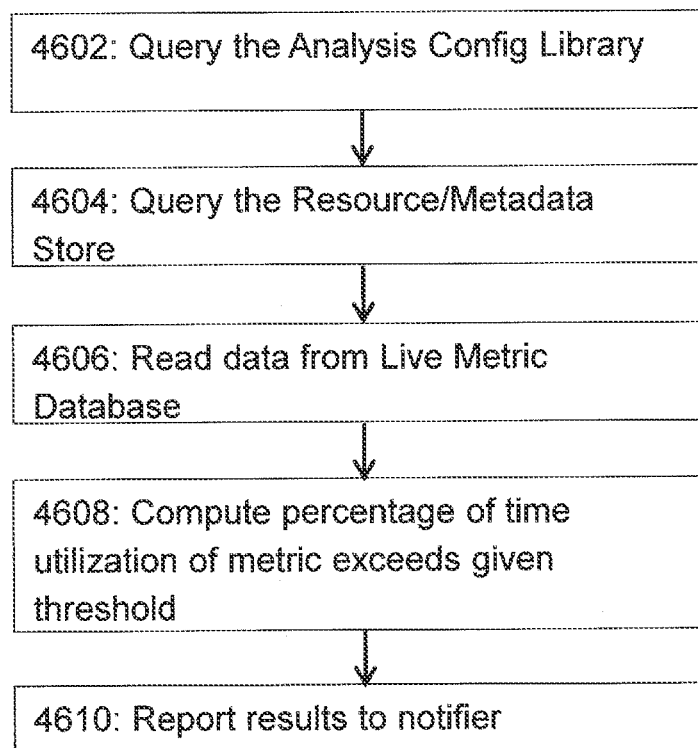

FIG. 4H shows a flowchart depicting data analyses that can be performed by the batch analysis and reporting module, according to some embodiments. One example algorithm for performing bottleneck identification is depicted in the flowchart in FIG. 4H. In step 4602, the analysis engine can query Analysis Config Library 5031 for the set of resource types and metrics that should be analyzed for utilization and the utilization threshold. In step 4604, the analysis engine can query Resource/Metadata Store 402 for resources in the customer environment. In step 4606, the analysis engine can query Live Metric Database 401 for data related to the required metric. In step 4608, the analysis engine can compute the percentage of time that the utilization of that metric exceeds the given threshold. In step 4610, if the percentage exceeds a specified threshold, the analysis engine can report the result to the Notifier 6021.

Yet another type of analysis that can be performed by the analysis engine is cluster utilization analysis. This type of analysis computes the aggregate resource utilizations across a cluster.

Figure 4I:
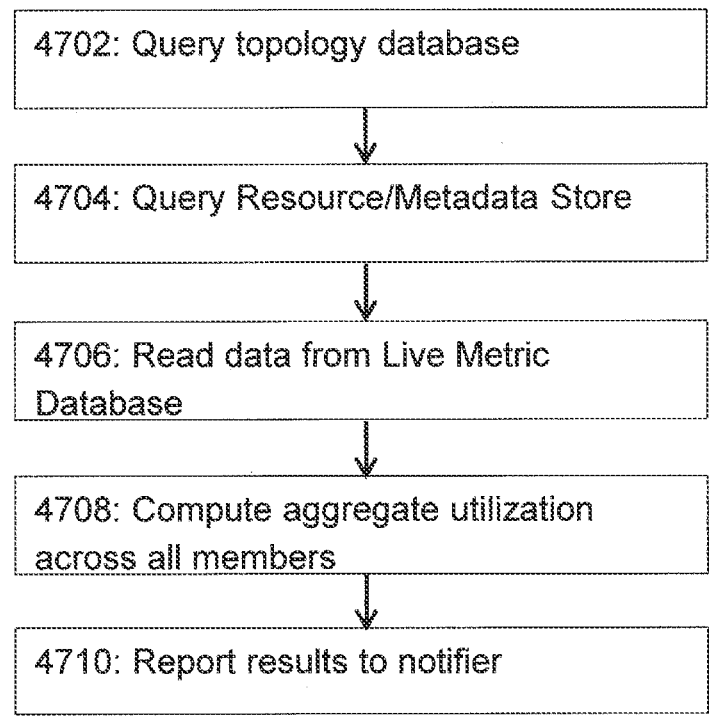

FIG. 4I shows a flowchart depicting data analyses that can be performed by the batch analysis and reporting module, according to some embodiments. One example algorithm for performing cluster utilization analysis is depicted in the flowchart in FIG. 4I. In step 4702, the analysis engine can query Application Database 405 for topology information for clusters. In step 4704, the analysis engine can query Resource/Metadata Store 402 for members of those clusters. In step 4706, the analysis engine can query Live Metric Database 401 for a metric across all members. In step 4708, the analysis engine can compute the aggregate utilization across all members in those clusters for the customer. In step 4710, the analysis engine can send the result to Notifier 6021.

Similar to how the analysis engine computes resource utilization across each customer's infrastructure, the analysis engine can also combine results across customers. The cross-customer results serve as a benchmark by which customers can evaluate and compare their usage.

All of the algorithms described above can be tuned by feedback provided by the customer, either explicitly or implicitly. Explicit feedback is information provided by the customer knowingly through feedback mechanisms defined in the monitoring system. Implicit feedback is information deduced by the monitoring system by observing customer interaction (or absence of interaction). Feedback (both explicit and implicit) might include information such as the following:

- A particular analysis result is not of interest.
- An analysis result is not of interest because the magnitude too small.
- An analysis result is not of interest because of the resource or group analyzed.
- An analysis result is not of interest because of the type of analysis.
- An analysis result is not of interest because of the metric analyzed.
- An analysis type should never be performed.
- An analysis type should never be performed for a resource or group.
- An analysis on a specified metric should never be performed.
- An analysis on a specified metric should never be performed for a resource or group.

Through feedback, the monitoring system can cater the analysis results that it performs and communicates to the user.

All of the above analytics, i.e., anomaly detection analysis, cluster outlier detection analysis, resource exhaustion prediction analysis, host contention detection, bottleneck identification, and cluster utilization analysis, can be enhanced using the inferred hierarchical relationships in the service architecture deducted by Application and Topology Discovery 501. Anomalies, outliers, resource exhaustion issues, host contention issues, bottleneck issues, cluster utilization issues, or other potential problems worthy of notification discovered within a group by the above-described analytics can be percolated up to parent groups within which the group is nested, and then further up to grandparent groups, etc. This escalation of issues up the chain to parent groups can be useful for conducting root cause analysis. For instance, the monitoring system can tell a customer that a problem has been discovered within a certain parent group (e.g., the "Cassandra" group). The customer can then drill down to see which sub-group within this group is causing the problem (e.g., "Cassandra cluster 34"), and then drill down further to sub-sub-groups (e.g., "Cassandra cluster 34, instance A"). In this way, the customer can quickly identify the root cause of the problem discovered within the parent group.

Figure 5:
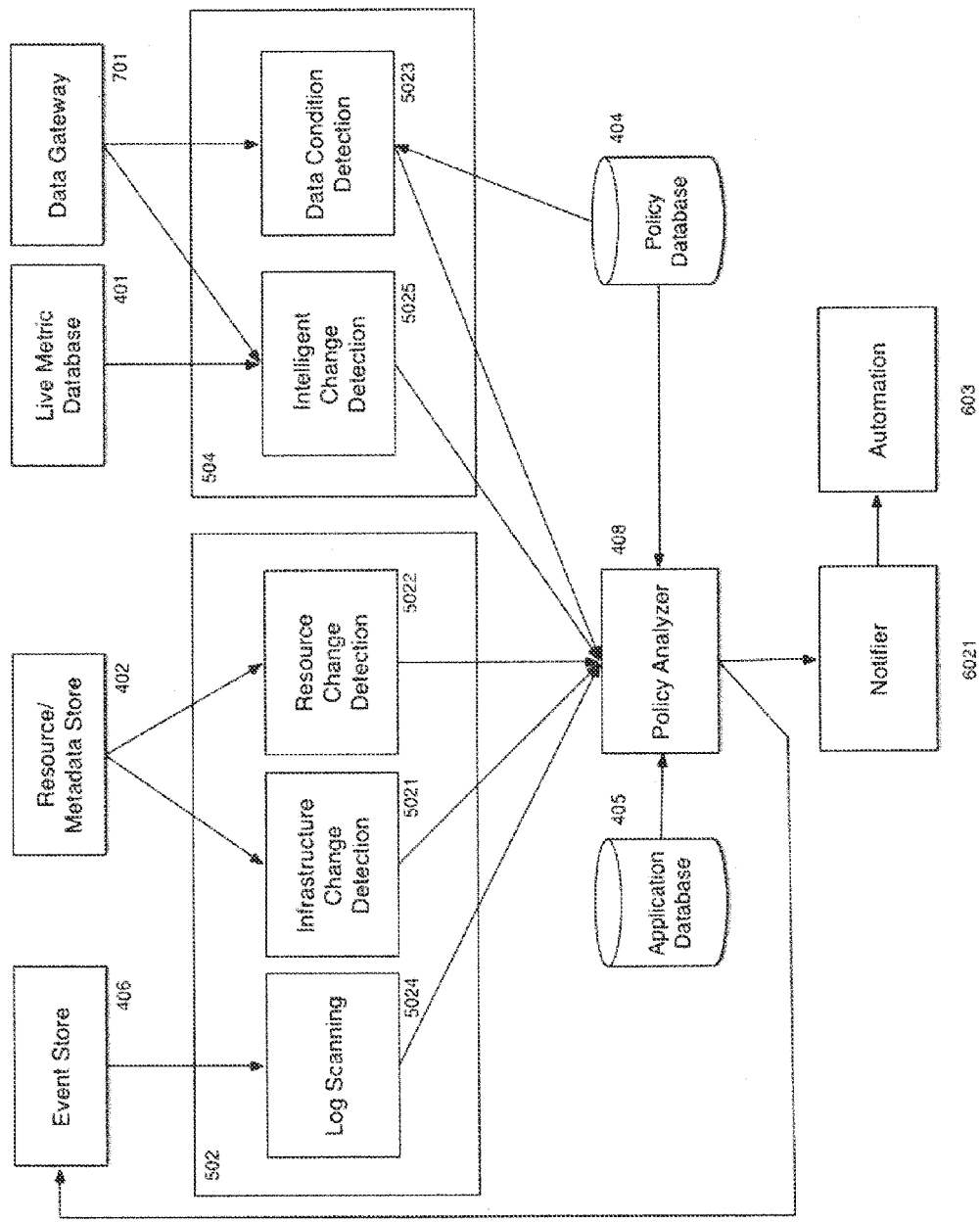
FIG. 5 is a block diagram showing the operation of the Event Detection module, the Exception Monitoring module, and the Policy Analyzer module, according to some embodiments.

FIG. 5 is a block diagram showing the operation of the Event Detection module, the Exception Monitoring module, and the Policy Analyzer module, according to some embodiments. Specifically, FIG. 5 shows the details of the Event Detection 502 and Exception Monitoring 504 modules. The Event Detection module 502 can be configured to sense when a new resource has been added or removed, and/or when there have been infrastructure-related changes in the customer environment. The Exception Monitoring module 504 can be configured to sense when monitored metrics in the customer environment behave in unexpected ways, which may be indicative of an anomaly or problem in the customer's application.

Event Detection module 502 can perform different types of analysis related to detection of infrastructure changes in the customer environment. Three example types of analysis are described below: Log Scanning 5024, Infrastructure Change Detection 5021, and Resource Change Detection 5022.

Log Scanning analysis 5024 takes as input log data from Event Store 406 (which Event Store 406 receives from Log Data Collector 306 via Data Gateway 701), and scans the log data to find patterns or events that should be noted to other parts of the system.

Infrastructure Change Detection analysis 5021 can detect changes in a customer's infrastructure using as input infrastructure metadata received from Resource/Metadata Store 402. Resource/Metadata Store 402, in turn, can receive this metadata from Infrastructure Platform Collector 301, which can receive it from Provider APIs 305. This infrastructure metadata can be global-scale metadata that describes the customer infrastructure, and can include the set of virtual resources in the environment, their location, and the security rules defined in the infrastructure. To detect changes in a customer's infrastructure (for example, when resources are added or removed), Infrastructure Change Detection analysis 5021 can keep an inventory of a customer's infrastructure in a database, and periodically update this inventory by querying Resource/Metadata Store 402 (which in turn receives information from Provider APIs 305). Event Detection module 502 can compare the results of each query with the state stored in the database.

As discussed above, the customer's infrastructure (i.e., the set of resources allocated to the customer by the infrastructure provider) can change dynamically as the customer grows and shrinks their environment to track short-term load changes (due to time of day or day of week) or long-term load changes (due to business growth or contraction) or replaces instances to deploy new software versions. Infrastructure Change Detection analysis 5021 can therefore query Resource/Metadata Store 402 (which in turn can query Provider APIs 305 via Infrastructure Platform Collector 301) frequently enough to capture an expected rate of change of the customer's infrastructure. In one embodiment, analysis 5021 can update the customer's infrastructure on a frequent but constant basis (e.g., 5 minutes). In another embodiment, analysis 5021 can vary its queries according to different times of day or seasons, or according to external events that are expected to cause large changes in the customer's infrastructure.

When new resources are detected in the customer's infrastructure, or when old resources are removed, Infrastructure Change Detection analysis 5021 can record that fact in Event Store 406 in two different ways: it can send a message to Event Store 406 via Data Gateway 701 (not shown in FIG. 5), or it can send a message to Event Store 406 via Policy Analyzer 408 (discussed in more detail below).

Resource Change Detection analysis 5022 can detect changes in resources used by a customer's application. This analysis uses as input resource metadata, which can also come from Resource/Metadata Store 402. Resource/Metadata Store 402, in turn, can receive this resource metadata from Infrastructure Platform Collector 301, which can receive it from Provider APIs 305. This resource metadata can include, for example, instance type, tags, and running services for virtual instances, and port maps and backing instances for hosted load balancers. Similar to Infrastructure Change Detection analysis 5021, Resource Change Detection analysis 5022 can store the state of resources monitored by the infrastructure in a database. When Resource Change Detection analysis 5022 receives new metadata for a resource, the analysis can compare the received metadata to the last known state of that resource. If the state of these resource has changed, an event is sent to Event Store 406 via Data Gateway 701 (not shown). Also similar to Infrastructure Change Detection analysis 5021, Resource Change Detection analysis 5022 can update its state for resources frequently enough to capture an expected rate of change of the customer's infrastructure.

Turning now to Exception Monitoring module 504, this module can also perform multiple types of analysis related to detecting exceptions in data streams of monitored metrics. Two examples types of analysis are described below: Data Condition Detection analysis 5023, and Intelligent Change Detection analysis 5025.

Data Condition Detection analysis 5023 accepts as input a stream of metric data directly from Data Gateway 701. This stream of metric data can be time series of measurements for metrics, coming from Provider APIs 305, System Data Collector 302, or Application Data Collector 303, and can include output from various applications and services. This stream of data is similar to the kind of data that is sent to and stored in Live Metric Store 401; however, for reliability reasons, Exception Monitoring module 504 can be configured to receive this data directly from Data Gateway 701, just in case Live Metric Store 401 is disabled or otherwise unavailable.

Data Condition Detection analysis 5023 can evaluate this stream of metric data for conditions. The conditions which it evaluates are based on policies stored in Policy Database 404. For example, Data Condition Detection analysis 5023 can evaluate whether a given metric is above or below a given minimum or maximum threshold. Alternatively, Data Condition Detection analysis 5023 can evaluate whether a given metric exceeds thresholds for a pre-configured period of time.

Sometimes, however, Exception Monitoring module 504 can receive metric data out of order. Or, a policy which Data Condition Detection analysis 5023 is evaluating can require 30 minutes or more of data in order to compute the result of the condition. To overcome these problems, Exception Monitoring module 504 can store in local memory enough data for the given metric as specified by the "duration" of the condition being evaluated (discussed below). Each time a measurement is streamed to the detector, the detector can merge the measurement with the existing set of measurements for the condition. For the "all" and "average" type of conditions (discussed below), the detector can update the value of the condition. If the value of the condition changes, the detector can emit an event to the Policy Analyzer 408.

The detector can also be configured to compensate for "flapping." Flapping is when the value of a condition changes incorrectly due to out of order messages. To avoid flapping, the detector can be configured to wait until a period of time has passed before emitting a message to the Policy Analyzer 408. The period of time can be based on the message delay that the detector is currently observing, which the detector can determine by analyzing the timestamps in the messages streaming through it. This probabilistic approach can help prevent flapping. The chance of flapping can be further reduced by additionally adding a buffer to the delay.

Intelligent Change Detection analysis 5025 is similar to but more sophisticated than Data Condition Detection analysis 5023. In particular, this type of analysis can take as input not only metric data from Data Gateway 701, but also past metric data from Live Metric Database 401. This added source of data allows Intelligent Change Detection analysis 5025 to perform more complex analyses. If, however, Live Metric Database 401 is disabled or otherwise unavailable, Exception Monitoring module 504 will not be able to perform Intelligent Change Detection analysis 5025.

Intelligent Change Detection analysis 5025 can search for deviations of behavior that have not been specifically configured by the user and stored in the Policy Database 404. The goals of this type of analysis is similar to that of the Anomaly Detection type analysis performed in the Analysis Engine 5032, i.e., this analysis uses past behavior (drawn from Live Metric Database 401) to create a model for behavior of a resource in the near future. As metric data arrives from Data Gateway 701, the detector compares that data against the model constructed from past data from Live Metric Database 401. If the data does not fit the model, the condition is raised. Because it operates on current data coming from Data Gateway 701, the algorithms used for detecting changes differ from that used by the Anomaly Detection type analysis used by the Analysis Engine 5032 in the Batch Analysis Subsystem 503. One example algorithm is given below.

Figure 5B:
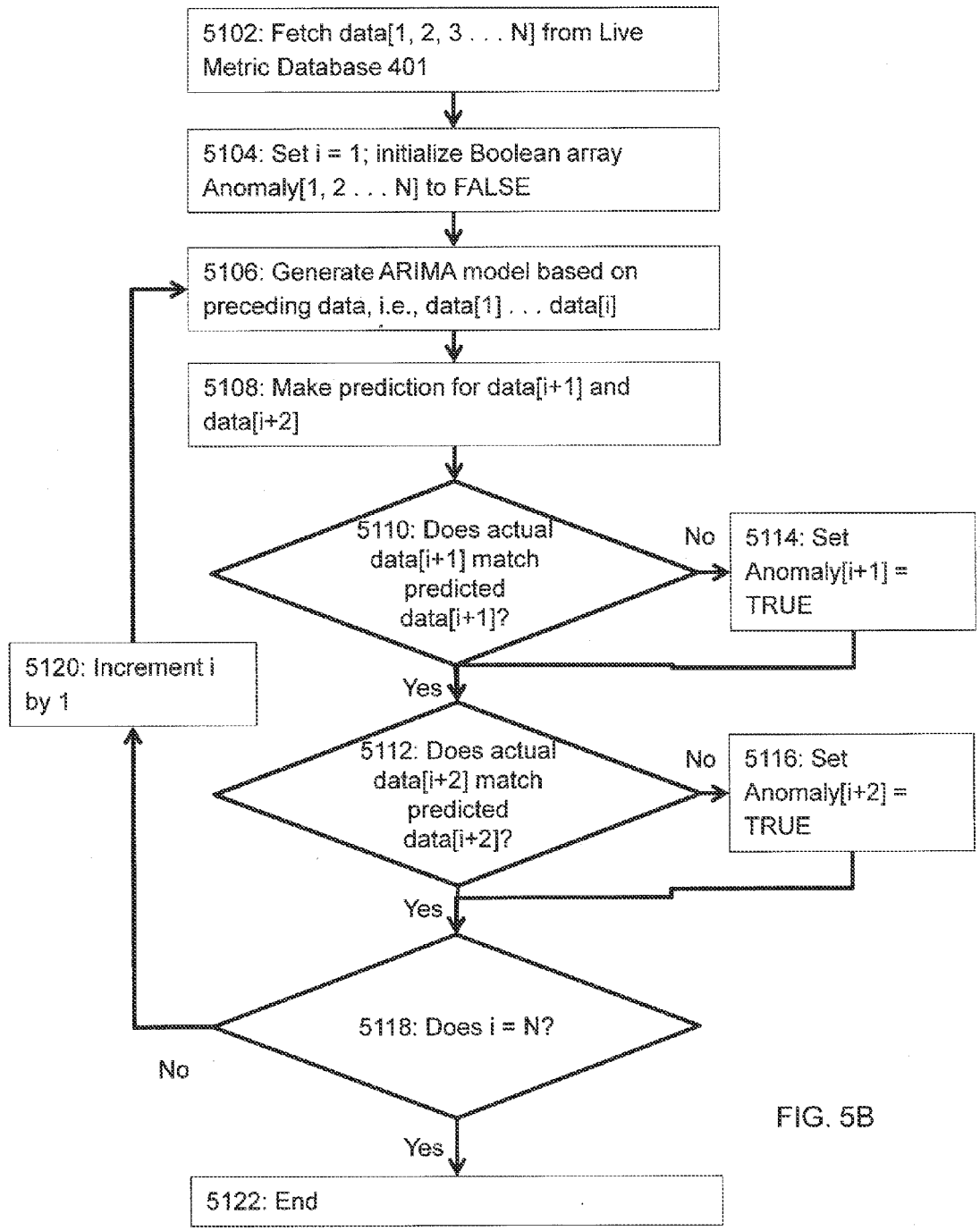
FIG. 5B is a flowchart depicting one example algorithm that can be used by Intelligent Change Detection analysis in the Exception Monitoring module, according to some embodiments.

FIG. 5B is a flowchart depicting one example algorithm that can be used by Intelligent Change Detection analysis in the Exception Monitoring module, according to some embodiments. Specifically, FIG. 5B depicts one potential way for Exception Monitoring Module 504 to perform Intelligent Change Detection analysis 5025. In step 5102, Intelligent Change Detection analysis 5025 fetches a time series of data comprising N data periods from Live Metric Database 401 and/or Data Gateway 701, i.e., data[1], data[2] . . . data[N]. In step 5104, Intelligent Change Detection analysis 5025 sets an index variable i to 1, and at the same time initializes a Boolean array of size N called "Anomaly" to FALSE. In step 5106, Intelligent Change Detection analysis 5025 generates an Auto-Regressive Integrated Moving Average (ARIMA) model using user-specified confidence intervals based on all data periods that precede period i, i.e., based on data[1] . . . data[i]. In step 5108, analysis 5025 makes a prediction for what the values for data[i+1] and data[i+2] should be based on the generated ARIMA model. This prediction can take the form of expected upper- and lower-bounds for each of data[i+1] and data[i+2] rather than discrete values. In step 5110, analysis 5025 compares the prediction for data[i+1] against the actual data[i+1]. If data[i+1] does not match the predicted data[i+1], or if data[i+1] falls outside the expected upper- and lower-bounds for data[i+1], then the corresponding entry in the Boolean array Anomaly (i.e., Anomaly[i+1]) is set to TRUE in step 5114. Similarly, in step 5112, analysis 5025 compares the prediction for data[i+2] against the actual data[i+2]. If data[i+2] does not match the predicted data[i+2], or if data[i+2] falls outside the expected upper- and lower-bounds for data[i+2], then the corresponding entry in the Boolean array Anomaly (i.e., Anomaly[i+2]) is set to TRUE in step 5116. In step 5118, analysis 5025 checks to see if it has iterated through all N periods, i.e., if i=N. If not, analysis 5025 can increment i by 1 in step 5120. Otherwise, analysis 5025 ends in step 5122. At the end of all the iterations, the resulting array Anomaly[1 . . . N] should have values set to TRUE where anomalies were detected in the metric data stream.

Two other data sources provide configuration information. Application Database 405 can store the result of Application and Topology Discovery 501. As discussed previously, Application and Topology Discovery 501 can analyze data and metadata from the customer's application to establish relationships between components of the customer's environment. The topology information can be used in the definition of some policies.

Policy Database 404 can store global, best-practice, and/or user-defined policies. A policy is a Boolean expression of conditions that are of interest to the customer.

A condition is a single comparison or test against data or metadata; in other words, conditions describe a change that is of interest to the user. Conditions for metadata may include: (i) a new resource was found, (ii) the security group for an instance was changed, and (iii) a tag was added to an instance.

Conditions on metric data can be more expressive. A metric-based condition is defined by a measurement threshold, a duration, and method. The method determines how to evaluate the series of measurements to determine the condition. There are three methods:

any—The condition is evaluated to true if any measurement exceeds the "threshold". For this method, the "duration" is ignored.

all—The condition is evaluated to true if all measurements in the period specified by "duration" exceed the "threshold".

average—The condition is evaluated to true if the average of measurements in the period specified by "duration" exceeds the "threshold".

The detectors (5021, 5022, 5023, 5024, and 5025) can then forward messages to the Policy Analyzer 408 describing changes in metadata and conditions. The Policy Analyzer can identify when the combination of conditions for a policy is met. It can read the set of policies from the Policy Database 404. For policies that refer to topological abstractions, it can also read information from the Application Database 405. The Policy Analyzer 408 can compare the state of the customer application as defined by the series of events emitted from the detectors that reflect conditions in the infrastructure against the policies. When the combination of conditions defined by a policy are satisfied, it can store in Event Store 406 a record indicating that a policy was satisfied, i.e., that an incident has occurred.

Policy Analyzer 408 is positioned to integrate and analyze the state of different condition types for different detector types. In other words, the Policy Analyzer can integrate data from each of Log Scanning 5024, Infrastructure Change Detection 5021, Resource Change Detection 5022, Intelligent Change Detection 5025 and Data Condition Detection 5023. These different types of detectors, in turn, receive data from each of Event Store 406, Resource/Metadata Store 402, Live Metric Database 401, and Data Gateway 701. The data processed by these detectors can comprise infrastructure metadata provided by Provider APIs 305, system-level data from System Data Collector 302, application-level data from Application Data Collector 303, log data from Log Data Collector 306 and http end-point data from Endpoint Monitoring Probes 307.

Policy Analyzer 408 can also send a message representing the incident to Notifier 6021. The notifier can determine whether and how notification of the incident should be made to the customer. If the customer has specified that the incident should be handled with an automatic response, the notifier can also send a message to the Automation 603 subsystem.

Policy Analyzer 408's ability to integrate and analyze as a whole data from all these diverse sources and data types can be extremely powerful. For example, if the System Data Collector stops sending data from a certain resource X, Exception Monitoring module 504 (in particular, Intelligent Change Detection analysis 5025 or Data Condition Detection 5023) might detect that condition and communicate to Policy Analyzer 408 that the condition has been detected, indicating that there might be a problem with resource X. Before sending an alert to Notifier 6021, however, Policy Analyzer 408 can first check, with the help of Event Detection module 502, the actual state of resource X, as indicated by the infrastructure metadata for resource X. For example, Policy Analyzer 408 can check whether resource X has been terminated or stopped. If resource X has been terminated or stopped, Policy Analyzer 408 can conclude that the absence of metrics from resource X is due to the termination of the resource rather than the failure of the software running on the instance. Since, as discussed above, the termination of a resource can be a common occurrence given the elastic nature of the cloud, Policy Analyzer can be configured to send only a low priority notification, or no notification at all to Notifier 6021. Alternatively, Policy Analyzer 408 can also check whether resource X was stopped because it was released by the customer (in which case termination/stoppage of resource X would not be a noteworthy event), or whether resource X was terminated because it was taken away by the infrastructure provider (in which case termination/stoppage of resource X would be a noteworthy event). In yet another alternative, if system-level metric data from System Data Collectors do not cut off completely, but indicate changed conditions at a resource (e.g., the resource is running at higher or lower capacity than before, or is more or less responsive than before), Policy Analyzer 408 can check the infrastructure metadata to determine the type of resource (e.g., AWS t1-micro or AWS m1-small) or the role of resource (e.g., web server vs. load balancer) so that it can apply the appropriate thresholds for determining whether the changed condition is worthy of notification. For example, the threshold for determining that an increase in web server load is worthy of notification to the customer can be different depending on whether the resource is an AWS t1-micro or an AWS m1-small. To emphasize, the Policy Analyzer is conditionally interpreting the detection of a condition (the absence of or change in metrics) based on the broader context of the state of the infrastructure.

Further, the Policy Analyzer could additionally consider the anticipated state of resource X. For example, the contents of the Event Store could contain audit logs (perhaps collected from the Log Scanning detector) indicating whether a resource was scheduled or requested to be terminated by the customer. If a request was made to terminate a resource by the customer to the infrastructure provider, then the resource's absence from the inventory at the scheduled time should not be considered worthy of notification. If, however, the instance is found to be terminated without request from the user, then the situation again becomes cause for notification.

By combining and analyzing together data from different data sources, Policy Analyzer 408 is able to discriminate between expected and unexpected changes in data conditions, and tailor its notification scheme accordingly. This example also illustrates why it is important for Infrastructure Change Detection analysis 5021 and Resource Change Detection analysis 5022 to keep their inventory of the customer's infrastructure up-to-date.

Another powerful way in which Policy Analyzer 408 can combine data from different sources to achieve more robust analysis is Policy Analyzer 408's ability to analyze data streams according to the service infrastructure stored in Application Database 405, as determined by Application and Topology Discovery 501. For example, a customer may want to be alerted only when two conditions are fulfilled: (i) a resource X of cluster Y is experiencing higher than usual load, and (ii) that resource X is experiencing higher load than its peer members in the same cluster Y. In other words, a customer may not care if the entire cluster is running hot, but be concerned if one member is experiencing heavier than usual load while the others are not. While Exception Monitoring module 502 can detect when condition (i) is fulfilled, i.e., that resource X is experiencing higher than usual load, Policy Analyzer 408 can also check for condition (ii) by consulting Application Database 405 to determine the list of resources that are also in cluster Y, and by checking the load conditions of those resources as well.

Figure 6:
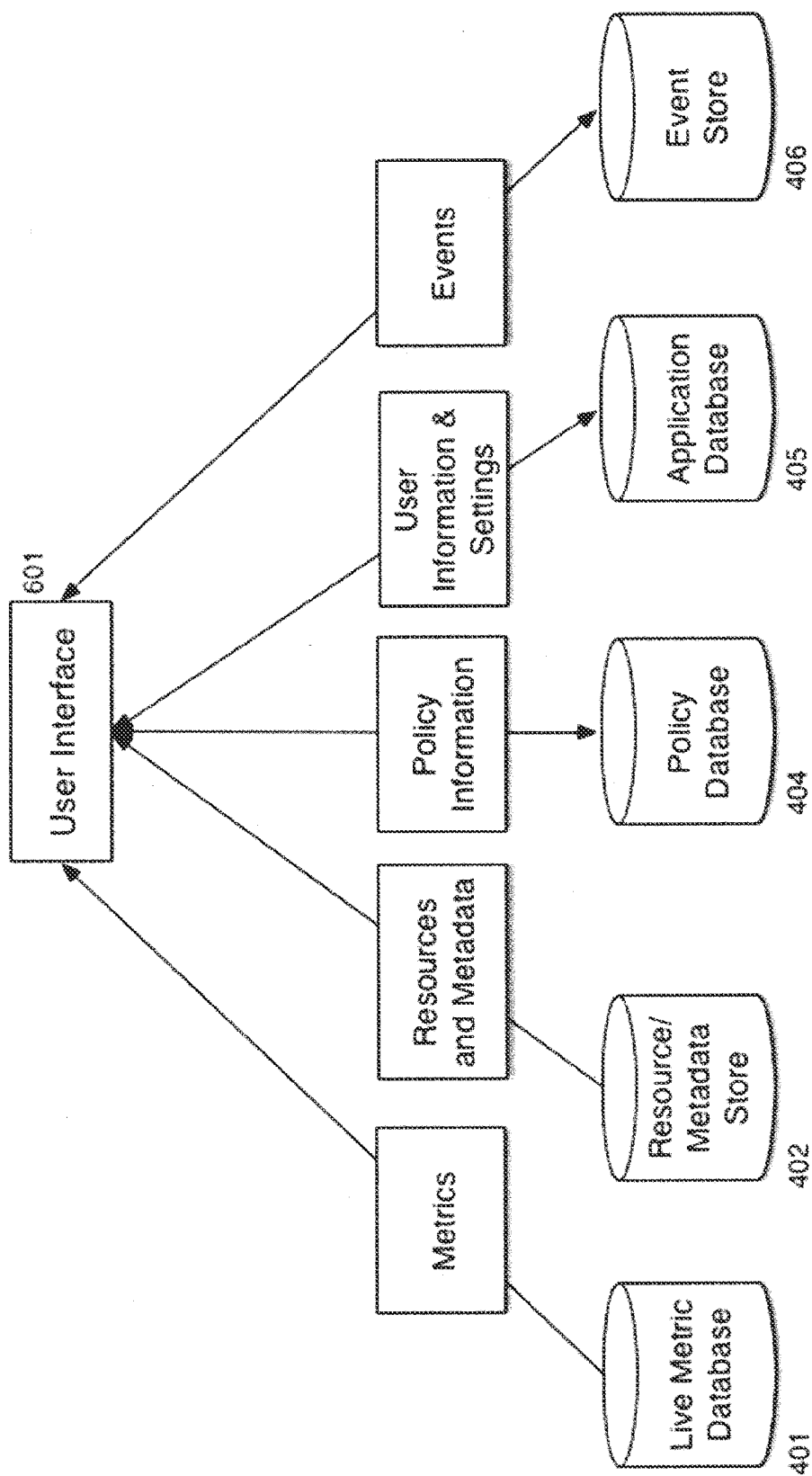
FIG. 6 is a block diagram showing the operation of the User Interface, according to some embodiments.

FIG. 6 is a block diagram showing the operation of the User Interface, according to some embodiments. Specifically, FIG. 6 depicts the flow of data to and from the user interface with which the customer/user interacts. User Interface 601 can provide the user with a mechanism through which to view resource and metric information. It also provides the user with a mechanism through which to view and update user settings and policy information. For example, users can add charts on dashboards. Users can also specify the metrics and resources that should be displayed.

When the user attempts to view pages that include metric data, User Interface 601 retrieves the appropriate metrics from Live Metric Database 401. Likewise, when resource information or metadata is requested, User Interface 601 retrieves resource inventory and metadata from the Resource/Metadata Store 402. When the user requests events information, the interface retrieves the data from the Event Store 406. When the user views, creates, edits, or deletes policy information, the interface contacts the Policy Database 404. When the user updates user information or application settings (like dashboard configuration or notification configuration), the interface uses the Application Database 405.

User Interface 601 can be configured to filter displayed pages so only those resources that satisfy filter criteria are displayed. For example, when a group filter is applied, the user interface can filter the view (e.g., resource lists and graphs) to include only those resources that satisfy the group criteria. When filter criteria is manually entered, the application can filter the page contents in real-time.

User Interface 601 can also be configured to allow the user to visualize metrics via a graphing module. The graphing module comprises the following settings:

Metrics—Specifies the metrics to be displayed in the chart.

Filter—Specifies the resources to be included in the chart.

Time Aggregation—Specifies that metrics should be aggregated across time. The consumer of the chart describes how much the data should be rolled up and the function to apply to the metrics during aggregation (all metrics, sum of metrics, average of metrics, median of metrics, 95th percentile value, 99th percentile value, etc.).

Resource Aggregation—Specifies that metrics should be aggregated across resources. This is commonly used to aggregate metrics across members of a group or cluster.

Timeframe—Specifies the start and end date and time for the metrics to be displayed on the charts in a page.

As discussed above, Analysis Config Library 5031 can store analysis configurations for various combinations of resource type, service type, and/or system/service metric. These analysis configurations are based on experienced practitioners' input. Part of these analysis configurations can include instructions for what metrics to show in the graphing module, what filters and time aggregation to apply, and what time-frame to display. In this way, the monitoring system can automatically display the most relevant metrics in the most intuitive display format immediately upon being connected to a new customer's application, without any input from the customer. While the customer can always customize what is displayed in User Interface 601 according to its needs, the monitoring system's ability to automatically "guess" at what the customer would like to view, and how the customer would like to view it, can significantly reduce setup time. For example, if a new customer defines a group to represent its web application, the customer could be automatically presented with a dashboard with key metrics related to the customer's load balancer, web server cluster, Apache web service, and other relevant service and infrastructure metrics. These metrics could also be displayed in the most intuitive format, with the appropriate time, and resource filters applied.

The graphing module can also support the following user interactions:

Highlight time series (hover)—Automatically shades any time series that the mouse pointer is not currently hovering over.

Highlight time series (lock)—Shades any time series for which the user has not toggled highlighting on.

Zoom—Enables the user to narrow the view to a particular timeframe.

Event details (hover)—Show details of events that occurred during the timeframe shown on the chart.

Legend toggle—Legends can be toggled on or off

Value details (hover)—By hovering over a data point on one of the curves, the chart will show the exact values of members.

There are many conditions under which it may not be necessary or appropriate to display all measurements for a particular time series. In these cases, the user interface will automatically request and display the aggregated data with an appropriate granularity from the appropriate databases.

Examples might include:

When viewing several weeks of data, it may be appropriate to show 60-minute averages.

When viewing several days of data, it may be appropriate to show 15-minute averages.

When viewing several hours of data, it may be appropriate to show 5-minute averages.

For certain user interactions, such as zooming, or changing the timeframe for a page, the system may select a new aggregation for the graphs.

Figure 7:
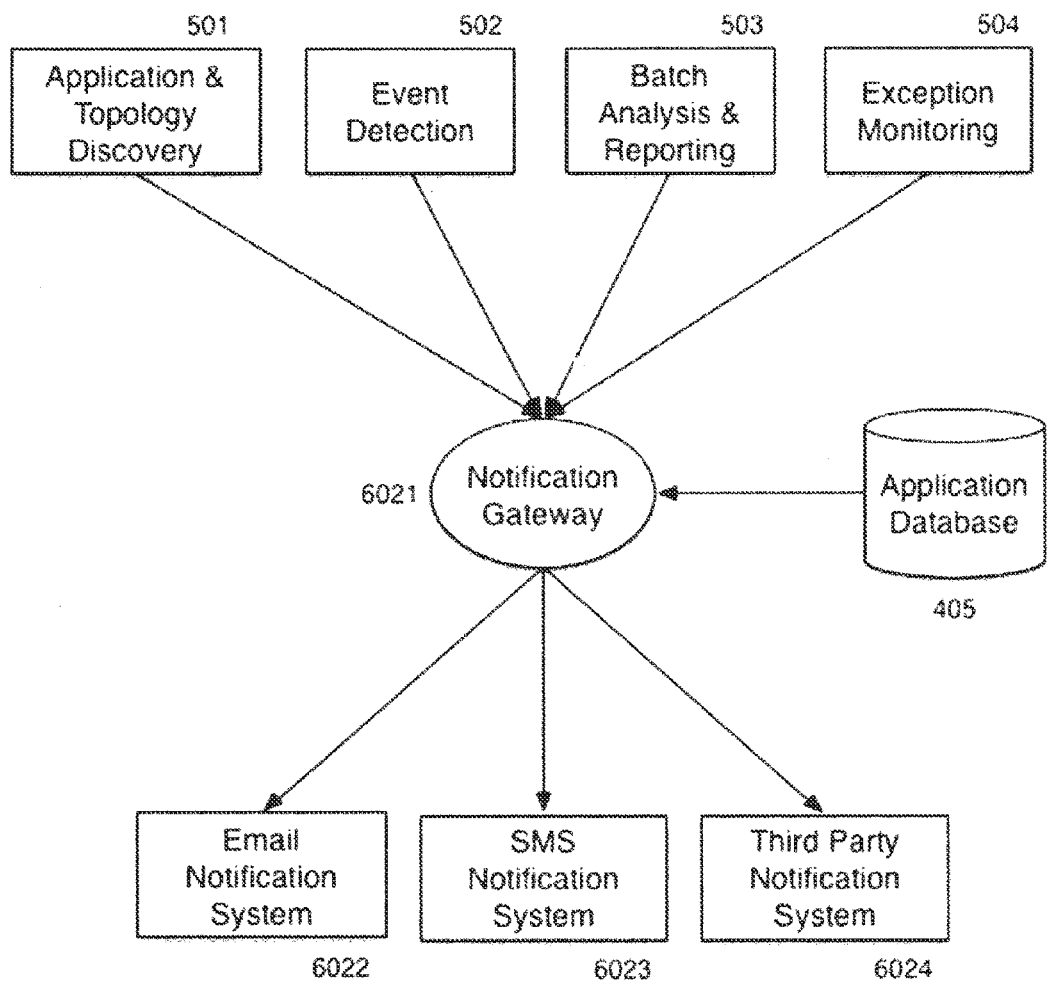
FIG. 7 is a block diagram showing the operation of the Notification Gateway, according to some embodiments.

FIG. 7 is a block diagram showing the operation of the Notification Gateway, according to some embodiments. Specifically, FIG. 7 shows the notification system for the monitoring system. The Application & Topology Discovery subsystem 501, Event Detection subsystem 502, Batch Analysis & Reporting subsystem 503 and Exception Monitoring subsystem 504 can all send information to the Notification Gateway 6021. Notification Gateway 6021 can then send notifications to a user or groups of users via a number of methods including email 6022, SMS 6023, and Third Party Notification Systems 6024.

Email Notification System 6022 can accept settings and content from other systems, and generate and send email messages to users via a hosted third-party email delivery service.

SMS Notification System 6023 can accept settings and content from other systems, and generate and send SMS messages to users via a hosted third-party SMS delivery service.

Third Party Notification Systems 6024 can be any other notification system which manages alerts and notifications to end users. Examples of such third party notification systems include notification services such as that provided by PagerDuty, or Webhook technology. Third party notification systems can be configured according to settings stored in Application Database 405.

Notification Gateway 6021 can also control the frequency of notifications. For example, it can notify the user only after an issue has been open for a specified length of time. It can also filter out notifications that are significantly similar to other recent notifications to limit the amount of information being pushed to users.

Figure 8:
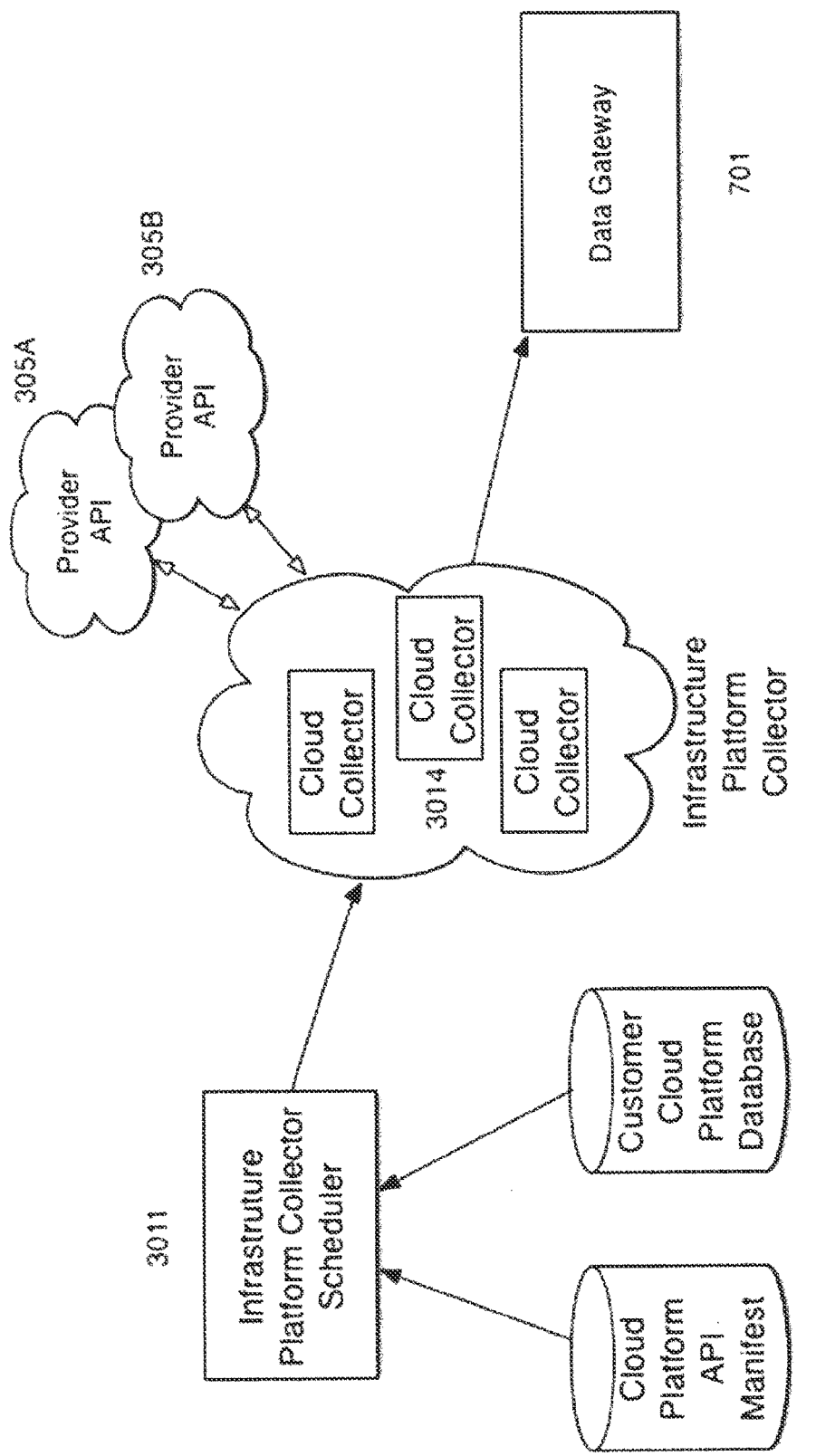
FIG. 8 is a block diagram showing how Infrastructure Platform Collector can be scaled to collect data from large numbers of Provider APIs, according to some embodiments.

FIG. 8 is a block diagram showing how Infrastructure Platform Collector can be scaled to collect data from large numbers of Provider APIs, according to some embodiments. Specifically, FIG. 8 shows how data can be collected from customer applications on a large scale. In particular, FIG. 8 shows how Infrastructure Platform Collector 3015 can be configured not as a single hardware/software module, but as a multitude of Cloud Collectors 3014, each of which can be implemented in a separate hardware/software instance. Infrastructure Platform Collector Scheduler 3011 can be responsible for coordinating the efforts of Cloud Collectors 3014 by scheduling collection tasks. To schedule tasks, Infrastructure Platform Collector Scheduler 3011 can track which cloud providers are used by which customers in the Customer Cloud Platforms Database 3013 and the set of APIs in each cloud platform in the Cloud Platform API Manifest 3012. Based on these inputs, the scheduler queues collection tasks to be run and provides the Cloud Collectors 3014 with all of the information they need to talk to the infrastructure provider. Cloud Collectors 3014 can de-queue tasks and communicate with Provider APIs 305A, 305B, etc. to collect the data they were assigned to collect. After collecting data, the Cloud Collectors 3014 in Infrastructure Platform Collector 3015 can push messages to Data Gateway 701.

Some cloud infrastructure providers use rate limiting (i.e., "throttling") on Provider APIs 305A, 305B, etc. This is a particular challenge for data collection at scale. Cloud Collectors 3014 use the Provider APIs on behalf of the customer, and rate limiting is imposed on the customer, not the monitoring system. The Infrastructure Platform Collector Scheduler 3011 can schedule collection tasks per customer to avoid rate limiting. For example, tasks can be scheduled on a periodic basis based on the desired fidelity of data. If, however, responses from the Provider APIs 305A, 305B, etc. indicate that the queries on behalf of a customer are being throttled, the Infrastructure Platform Collector Scheduler can reduce the frequency of data collection for that specific customer. If a customer has more resources than can be queried at the desired frequency within the constraints of the rate limiting, the Infrastructure Platform Collector Scheduler 3011 must reduce the frequency of collection across all the customer's resources. Infrastructure Platform Collector Scheduler 3011 can reduce the frequency of all resources uniformly. Or it can skip monitoring for a random set of resources in each collection interval.

Figure 9:
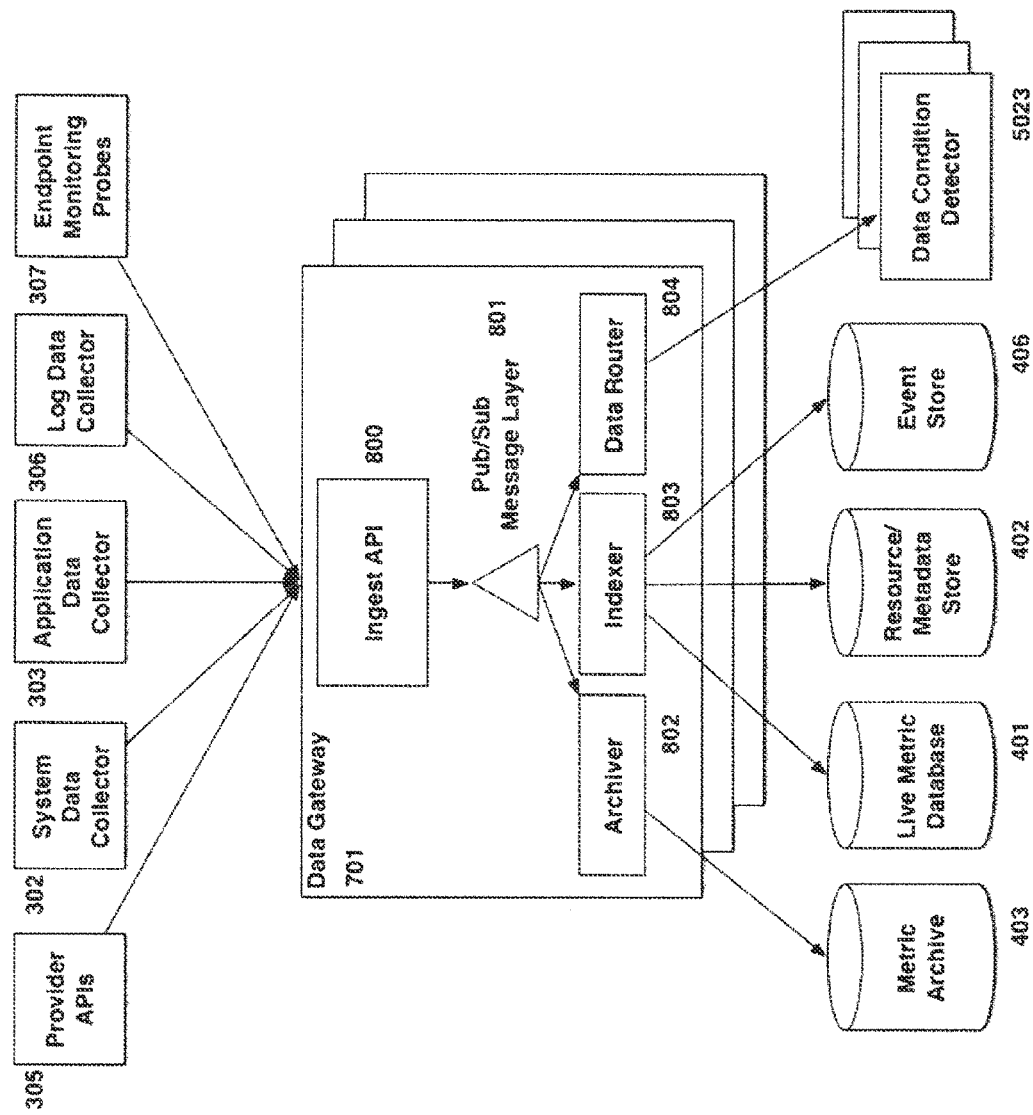
FIG. 9 is a block diagram showing how the Data Gateway can be scaled to collect data from large numbers of data collectors, according to some embodiments.

FIG. 9 is a block diagram showing how the Data Gateway can be scaled to collect data from large numbers of data collectors, according to some embodiments. Specifically, FIG. 9 shows how Data Gateway 701 can be scaled out to enable the monitoring system to support high load (message rate). For example, where Data Gateway 701 had been previously described as a single module, Data Gateway 701 can also be configured as multiple software/hardware modules that work in parallel to handle more load, as indicated by the "stack" of Data Gateways 701 in FIG. 9. This figure shows internal details of a single Data Gateway. The Ingest API 800 can provide a web service to accept and validate the input messages. It can push the messages to a publish/subscribe service (Pub/Sub Message Layer 801), such as RabbitMQ. Several other components subscribe to messages published by the Ingest API.

Archiver 802 can subscribe to all messages from the collection API. The archiver lightly processes the messages, especially ensuring the integrity and ordering of the messages. Then messages can then be stored in Metric Archive 403. Archive 403 is assumed to be capable of handling the write throughput requirements of the monitoring system.

Indexer 803 also subscribes to all messages from the Ingest API. It divides those messages into several different types: inventory and resource metadata messages, measurement messages, and event messages. Metadata messages are forwarded to the Resource/Metadata Store 402. Measurement messages are stored in the Live Metric Database 401. Events are stored in the Event Store 406. Again, it is assumed that these data sinks can scale out to accommodate the load. Scale out NoSQL databases, like Cassandra, are examples of technologies that can handle the load for data measurements. Distributed search clusters, like ElasticSearch, are examples of technologies that can handle the load of metadata messages and event messages.

Data Router 804 subscribes to measurement messages. It routes those messages to any Data Condition Detectors 5023 that need the data to evaluate conditions. This route could be based on, for example, a customer identifier.

Many other components in the monitoring infrastructure require the ability to scale out. This capability is often linked to the high-availability strategy. A group membership service, like Zookeeper, maintains the manifest of instances serving a given role. If instances are stateless, like the Cloud Collector (3014), the group membership service simply tracks the instances participating. Services that maintain state can also use the group membership service to describe how to route work to instances in the service.

Systems, methods, and non-transitory computer program products have been disclosed for monitoring and analyzing operation of a widely distributed service operated by an Infrastructure-as-a-Service (IaaS) tenant but deployed on a set of virtual resources controlled by an independent IaaS provider. The set of virtual resources provided to the IaaS tenant by the IaaS provider is selected by the IaaS provider and can change rapidly in both size and composition (i.e., the virtual resources are "ephemeral" from the perspective of the IaaS tenant). The monitoring system can monitor and determine relevant alerts based on system-level metrics collected directly from virtual resources with infrastructure metadata that characterizes the virtual resources collected from the IaaS provider to report on operation of the virtual resources. For example, the infrastructure metadata can contain a resource type, a resource role, an operational status, an outage history, or an expected termination schedule. The monitoring system can analyze the system-level metrics to report on operation of at least part of the set of virtual resources. The monitoring system can condition the reporting based on the infrastructure metadata to avoid inaccurate analysis.

The monitoring system can also automatically infer—without human modelling input or information regarding actual physical network connectivity—a service architecture of a widely distributed service operated by an IaaS tenant but deployed on a set of virtual resources controlled by an independent IaaS provider. Specifically, the monitoring system can automatically infer from the metadata and/or metric data how the virtual resources should be organized into groups, clusters and hierarchies. The present systems can automatically infer this service architecture using naming conventions, security rules, software types, deployment patterns, and other information gleaned from the metadata and/or metric data. The present systems can then run analytics based on this inferred service architecture to report on service operation.

The monitoring system can also rapidly update a dynamic service architecture of a widely distributed service operated by an IaaS tenant but deployed on a set of virtual resources controlled by an independent IaaS provider. For example, the monitoring system can infer from the infrastructure metadata and/or system-level metric data how the virtual resources should be organized into groups, clusters and hierarchies. The monitoring system can also update the dynamic service architecture frequently, to capture an expected rate of change of the resources, e.g., every five minutes.

The monitoring system can also evaluate performance of virtual resources deployed in a widely distributed service operated by an IaaS tenant but deployed on a set of virtual resources controlled by an independent IaaS provider, and infer that a virtual resource within the set of virtual resources may be hosted on at least one physical resource that is underperforming. Although the monitoring system may not have visibility into the composition, configuration, location, or any other information regarding the set of physical resources, the present system is able to evaluate the performance of the virtual resources and infer that a virtual resource within the set of virtual resources may be hosted on at least one physical resource that is underperforming.

The present system can also monitor and analyze cluster performance by detecting outliers in a widely distributed service operated by an IaaS tenant, but deployed on a set of virtual resources controlled by an independent IaaS provider. The set of virtual resources can be organized into clusters in which resources are expected to behave similarly to each other. Virtual resources that do not behave similar to peer resources in the same cluster—i.e., outliers—may be indicative of problems that need to be addressed. The present system can collect performance metric data from virtual resources, and compare the performance of each virtual resource in a cluster with the performance of every other virtual resource in the cluster to detect outliers. This comparison can involve correlation analysis, ANOVA analysis, or regression analysis, as described earlier.

Other embodiments are within the scope and spirit of the present systems and methods. For example, the functionality described above can be implemented using software, hardware, firmware, hardwiring, or combinations of any of these. One or more computer processors operating in accordance with instructions may implement the functions associated with semantically modelling and monitoring applications and software architecture hosted by an IaaS provider in accordance with the present disclosure as described above. If such is the case, it is within the scope of the present disclosure that such instructions may be stored on one or more non-transitory processor readable storage media (for example, a magnetic disk or other storage medium). For example, the ephemeral resources described above may be stored on non-transitory processor readable storage media under direct or indirect control of the IaaS provider. Additionally, as described earlier, modules implementing functions may also be physically located at various positions, including being distributed such that portions of functions are implemented at different physical locations.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A system comprising non-transitory memory with programmable instructions for detecting outlier virtual resources that perform differently from peer virtual resources within a cluster of virtual resources that are expected to perform similarly, the virtual resources being provided by an independent Infrastructure-as-a-Service (IaaS) provider to an IaaS tenant for operating a widely distributed service, wherein the widely distributed service may be at least one of geographically dispersed, part of different communication networks, and disjoint, wherein the IaaS provider is responsible for selection of resources, wherein an operational capacity of the resources may change substantially and rapidly, and wherein the IaaS tenant has no direct control over, and limited visibility into, the selection of resources, the system comprising:

a data gateway configured to collect substantially live system-level metrics related to the operation of the cluster of virtual resources; and an analysis module configured to:

compare the live system-level metrics for each virtual resource in the cluster of virtual resources against live system-level metrics for other virtual resources in the cluster of virtual resources, wherein a cluster is a group of resources expected to behave similarly; and determine that a given virtual resource is an outlier based on the comparison of the live system-metrics between each virtual resource against other virtual resources, wherein an outlier virtual resource is determined if a difference between the live system-level metrics for the given virtual resource and the live system-level metrics for other virtual resources in the cluster of virtual resources exceeds a predetermined threshold, and wherein the determination that the given virtual resource is an outlier includes performing correlation analysis on the given virtual resource, performing ANOVA analysis on the given virtual resource, or performing regression analysis on the given virtual resource;

provide, at a user interface, a notification to a user that the given virtual resource is an outlier amongst the given virtual resource's peer virtual resources within the cluster of virtual resources.

2. The system of claim 1, wherein the predetermined threshold is based on at least one of a resource type of the given virtual resource, a resource role of the given virtual resource, the live system-level metric being compared, and feedback from the IaaS tenant in response to previously determined outliers.

3. The system of claim 1, wherein the analysis module is configured to perform correlation analysis, including:

compute a correlation matrix for the system-level-metrics for all resources in the cluster of virtual resources;

sum, for each virtual resource in the cluster of virtual resources, the correlations of the system-level metrics for that resource against the system-level metrics of all other peer virtual resources in the cluster of virtual resources; and determine that a given virtual resource is an outlier if the sum for the given virtual resource is more than one quartile away from a median for the sum for all the virtual resources in the cluster of virtual resources.

4. The system of claim 1, wherein the analysis module is configured to:

collapse the system-level metrics for all resources in the cluster of virtual resources by removing time labels;

detect whether there is an outlier by determining whether the collapsed system-level metrics for at least one virtual resource exhibits a substantially different mean and variance than means and variances for other virtual resources by performing the ANOVA analysis;

if an outlier is detected, determine which virtual resource is the outlier using the Tukey HSD test.

5. The system of claim 1, wherein the analysis module is configured to perform regression analysis, including:

regress, for each virtual resource in the cluster of virtual resources, the live performance-metric data for all other peer virtual resources in the cluster of virtual resources as independent variables onto the live performance-metric data for the virtual resource being analyzed as the dependent variable;

compute the goodness-of-fit for the regression for each virtual resource in the cluster of virtual resources; and determine that a given virtual resource is an outlier if the goodness-of-fit for the regressions for all other virtual peer resources in the cluster satisfy a pre-defined threshold, but the goodness-of-fit for the regression of the given virtual resource does not satisfy the pre-defined threshold.

6. The system of claim 1, wherein the data gateway is configured to collect the substantially live system-level metrics at a frequency that is high enough to capture an expected rate of change of the set of virtual resources.

7. The system of claim 6, wherein the frequency is once every five minutes.

* * * * *